United States Patent
Sugiura

(10) Patent No.: US 8,057,339 B2
(45) Date of Patent: *Nov. 15, 2011

(54) PULLEY HOLDER AND A DRIVE TRANSMISSION MECHANISM AND AN IMAGE RECORDING APPARATUS USING THE PULLEY HOLDER

(75) Inventor: Toshio Sugiura, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 419 days.

This patent is subject to a terminal disclaimer.

(21) Appl. No.: 11/616,115

(22) Filed: Dec. 26, 2006

(65) Prior Publication Data
US 2007/0155561 A1 Jul. 5, 2007

(30) Foreign Application Priority Data
Dec. 29, 2005 (JP) .................................. 2005-380674

(51) Int. Cl.
*F16H 7/12* (2006.01)
(52) U.S. Cl. ........................................ 474/198; 474/136
(58) Field of Classification Search .................. 474/162, 474/136, 138, 198, 199; 464/179; 403/1, 403/3, 4, 383
See application file for complete search history.

(56) References Cited

U.S. PATENT DOCUMENTS

| | | | |
|---|---|---|---|
| 1,998,116 A * | 4/1935 | Bone | 411/398 |
| 4,610,645 A * | 9/1986 | Donn et al. | 474/112 |
| 4,746,237 A | 5/1988 | Takeda | |
| 6,123,473 A | 9/2000 | Guillen et al. | |
| 6,690,494 B1 | 2/2004 | Yamada | |
| 2005/0243125 A1* | 11/2005 | Ishikawa | 347/37 |
| 2006/0157381 A1* | 7/2006 | Adams et al. | 206/713 |
| 2007/0142117 A1* | 6/2007 | Centi et al. | 464/179 |
| 2007/0151830 A1 | 7/2007 | Kawamata | |

FOREIGN PATENT DOCUMENTS

| | | |
|---|---|---|
| JP | H05-074848 U | 10/1993 |
| JP | H06-011004 A | 1/1994 |
| JP | H07-001786 A | 1/1995 |
| JP | H03-016172 U | 7/1995 |
| JP | H07-7293671 A | 11/1995 |
| JP | H09-240100 A | 9/1997 |
| JP | H10-076731 A | 3/1998 |
| JP | H10-129069 A | 5/1998 |

(Continued)

OTHER PUBLICATIONS

U.S. Patent and Trademark Office, Office Action in co-pending U.S. Appl. No. 11/616,997, notification sent on Apr. 3, 2009.

*Primary Examiner* — Robert Siconolfi
*Assistant Examiner* — Anna Momper
(74) *Attorney, Agent, or Firm* — Baker Botts L.L.P.

(57) ABSTRACT

A pulley holder for rotatably supporting a pulley around which a belt is wound, in which the pulley holder includes a shaft having a shaft body for supporting the pulley and a projection at least one end of the shaft body in its axial direction, and a holder body having a bearing for supporting the shaft body, and a fitting part for fitting the projection. Since the projection is biased from an axis of the shaft body, once the projection is fit into the fitting part, the shaft body would not rotate around the axis. Accordingly, a friction wear of the bearing of the holder body is prevented and thus a shift in conveying a carriage is prevented.

13 Claims, 22 Drawing Sheets

FOREIGN PATENT DOCUMENTS

| | | |
|---|---|---|
| JP | 2000-037921 A | 1/2000 |
| JP | 2001-058435 A | 3/2001 |
| JP | 2001-158145 A | 6/2001 |
| JP | 2001-171193 A | 6/2001 |
| JP | 2002-3156260 A | 10/2002 |
| JP | 2005-313492 A | 11/2005 |

* cited by examiner

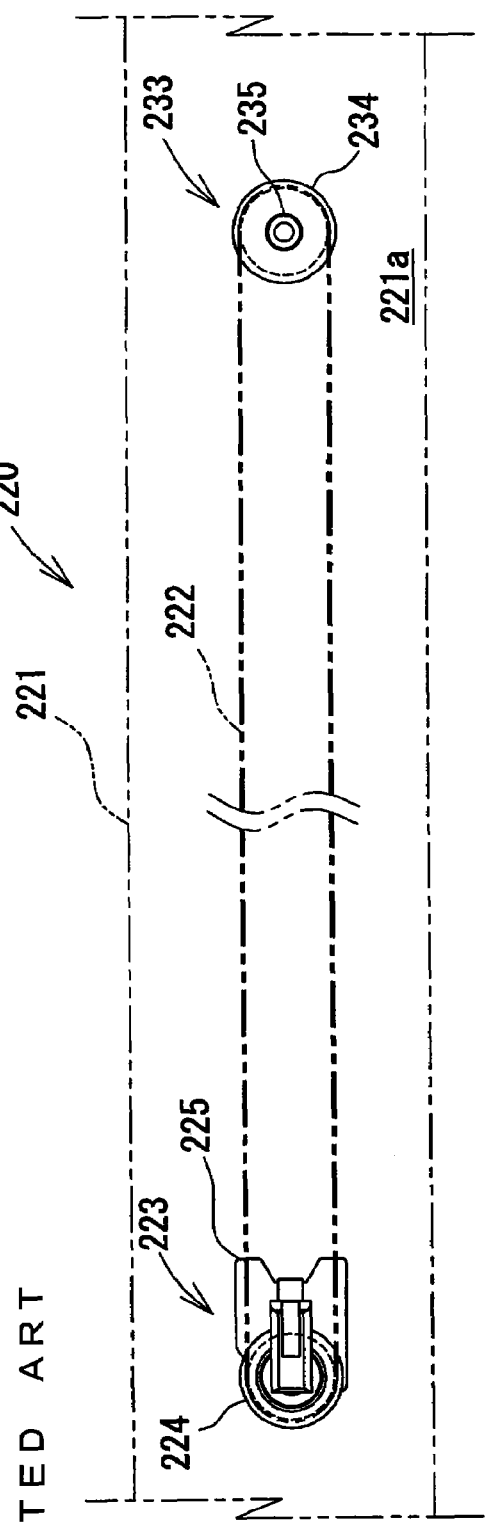
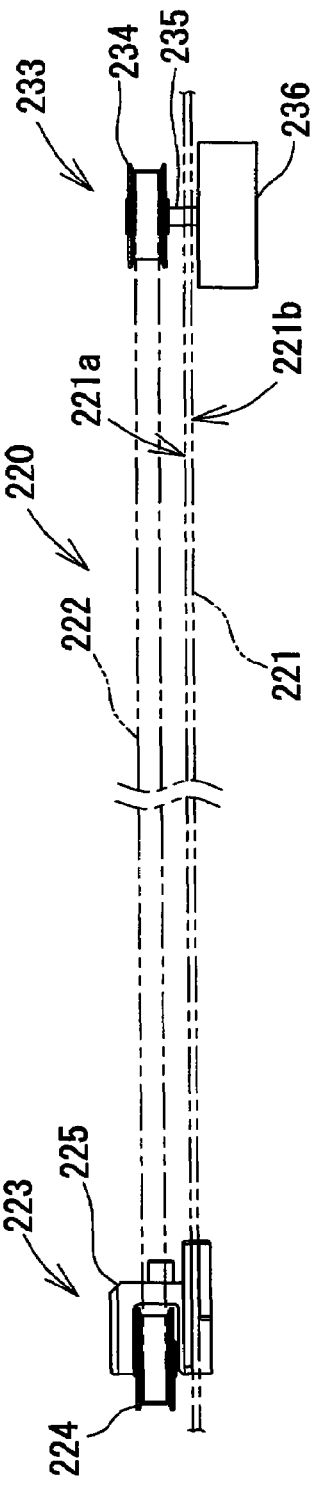
FIG. 1A RELATED ART
FIG. 1B RELATED ART

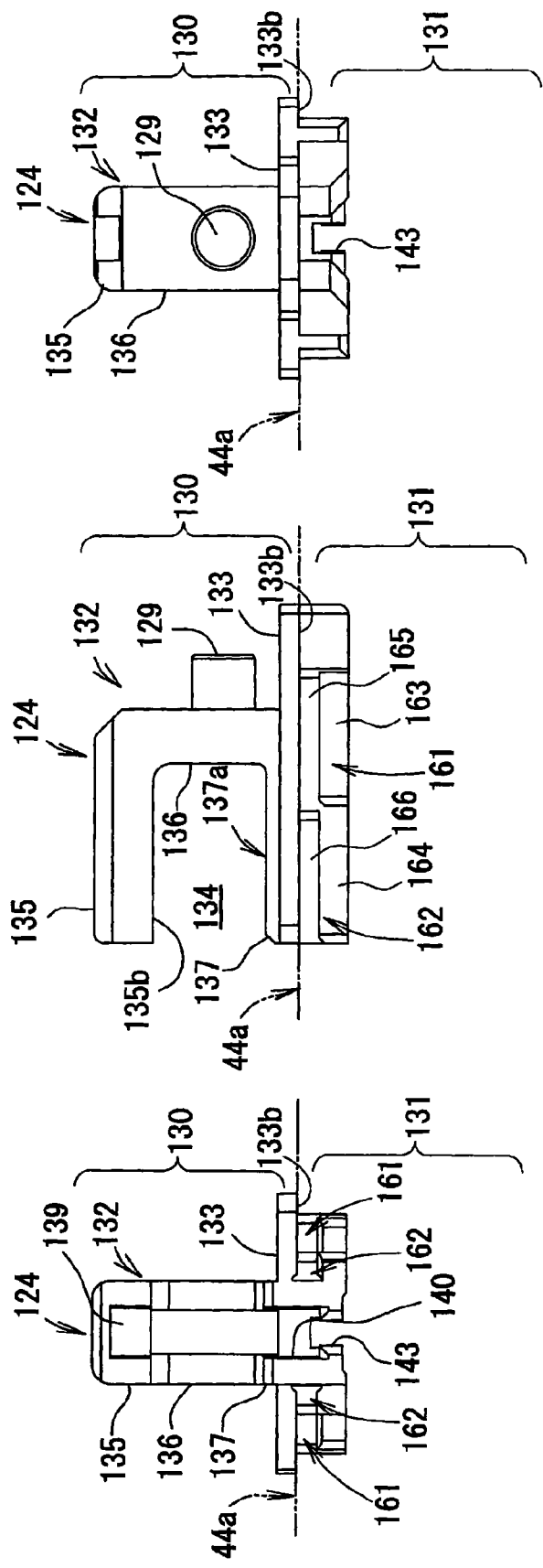

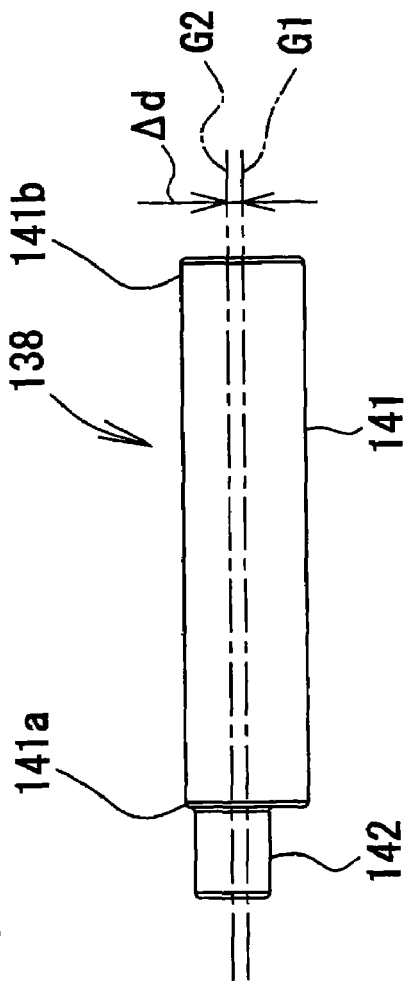
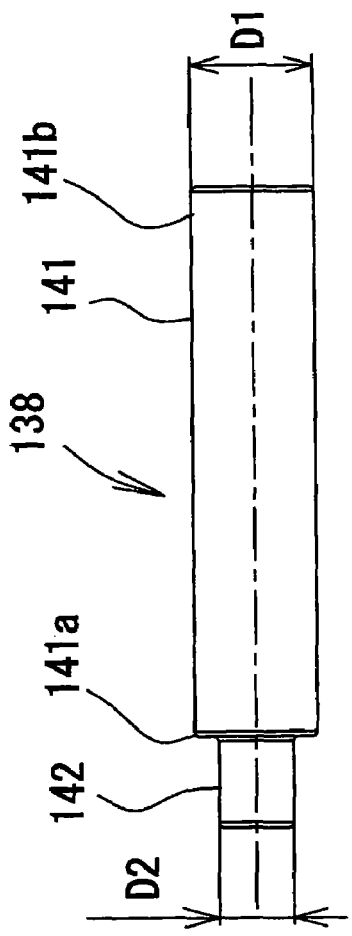
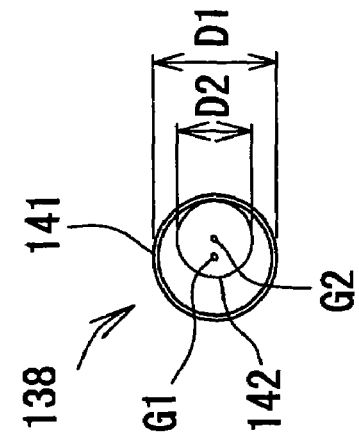
FIG. 18B
FIG. 18A
FIG. 18C

PULLEY HOLDER AND A DRIVE TRANSMISSION MECHANISM AND AN IMAGE RECORDING APPARATUS USING THE PULLEY HOLDER

CROSS-REFERENCE TO RELATED APPLICATIONS

This Nonprovisional application claims priority under 35 U.S.C. §119(a) on Patent Application No. 2005-380674 filed in Japan on Dec. 29, 2005, the entire contents of which are hereby incorporated by reference.

BACKGROUND

The present invention relates to a pulley holder for supporting rotatably a pulley around which a belt is to be wound, and a drive transmission mechanism and an image recording apparatus using this pulley holder.

In an ink jet type image recording apparatus, the drive transmission mechanism that transmits a driving force to a carriage which is supported in a slidable manner in a predetermined direction has been conventionally known (see Japanese Patent Application Laid-Open No. 2005-313492). FIG. 1A illustrates a plan view of a known drive transmission mechanism 220. FIG. 1B illustrates a front view of FIG. 1A. The drive transmission mechanism 220 has such a structure that a driving pulley unit 233 and a driven pulley unit 223 are provided on a frame 221 such that the driving pulley unit 233 and the driven pulley unit 223 are positioned apart by a predetermined distance and an endless belt 222 is stretched between the units.

The driving pulley unit 233 includes a motor 236 arranged on a lower surface 221b of the frame 221, a motor shaft 235 that pierces through the frame 221 from the lower surface 221b to an upper surface 221a of the frame 221, and a driving pulley 234 coupled to the motor shaft 235. Further, the driven pulley unit 223 includes a pulley holder 225 secured to the frame 221 and a driven pulley 224. The belt 222 is stretched between the driving pulley 234 and the driven pulley 224. A rotatable force of the driving pulley 234 allows the belt 222 to circle around the pulleys. The belt 222 circling around the pulleys is coupled to the carriage and thus the carriage moves in association with the circular movement of the belt 222 in a predetermined direction.

FIGS. 2A and 2B illustrate enlarged detailed views of the driven pulley unit 223. FIG. 3 illustrates a cross sectional view of FIG. 2B taken along a line III-III. The pulley holder 225 generally includes a supporting arm 229 that supports the driven pulley 224 in a rotatable manner, an inserted part 238 that is inserted into an insertion hole 241 provided in the frame 221 (see FIG. 4), and a restricting part 226 that restricts a downward movement of the inserted part 238. In FIGS. 2A and 2B, a lower part of a lower surface 226a of the restricting part 226 in the drawing sheet is the inserted part 238. The inserted part 238 is provided with a stop part 227 projecting perpendicularly to the drawing sheet surface of FIGS. 2A and 2B. Further, a groove 228 is provided between the stop part 227 and the restricting part 226 to receive a corresponding fitting edge 242 (see FIG. 4) that is formed at an edge part of the insertion hole 241. Bottom surfaces 230 of the grooves 228 are angled with a predetermined draft angle φ.

In the pulley holder 225 having the above described structure, the inserted part 238 is inserted into the insertion hole 241 and the pulley holder 225 slides in a leftward direction in the drawing sheet of FIG. 4 (a direction as indicated by an outlined arrow), resulting in that the fitting edges 242 are fit into the grooves 228 while the fitting edges 242 contacts the grooves 228, respectively. As such, the pulley holder 225 is secured to the frame 221 in a vertical direction. Further, a fixture, which is not shown here, fixes the pulley holder 225 so as not to slide in a horizontal direction in FIGS. 2A and 2B.

SUMMARY

There are cases where a pulley body 224a is formed of a synthetic resin and a shaft 224b thereof is formed of a metal, and those independent members are finally formed into the driven pulley 224. In such a case, there occurs a friction wear in two areas due to a sliding movement between the pulley body 224a and the shaft 224b and between the shaft 224b and the pulley holder 225. Specifically, a problem of the friction wear between the shaft 224b and the pulley holder 225 causes a fluctuation of a tension of the belt 222 and a distance between the pulleys, thereby hampering a smooth driving of the belt. Further, the problem causes a shift in conveying the carriage, resulting in a possible lowering of an image quality of the image recording apparatus.

The present invention has been made in view of the above circumstances, and therefore an object of the present invention is to provide a pulley holder that prevents a friction wear of a bearing of a holder body having a shaft for supporting a pulley, and a drive transmission mechanism and an image recording apparatus using this pulley holder.

The pulley holder according to the present invention is the one that supports a pulley in a rotatable manner, with a belt being wound around the pulley. The pulley holder according to the present invention includes a shaft having a shaft body for supporting the pulley and having a projection at least one end of the shaft body in an axial direction thereof, the projection being biased from an axis of the shaft body and projecting in the axial direction of the shaft body, a holder body having a bearing for supporting the shaft body and having a fitting part for fitting the projection.

In this pulley holder, the shaft is held by the holder body. The shaft body that supports the pulley is supported by the bearing of the holder body and the projection that is biased from the axis of the shaft body and projects from at least one end of the shaft body is fit into the fitting part of the holder body. Since the projection is biased from the axis of the shaft body, the shaft body does not rotate around the axis when the projection is fit into the fitting part. Accordingly, the friction wear of the bearing of the holder body can be prevented to thereby prevent a deviation in conveying the carriage and the lowering of the image quality.

In addition, the projection may have an axis in parallel with the axis of the cylindrical shaft body, and may be a cylindrical member having a diameter smaller than that of the shaft body. Further, the projection may be formed into one piece with the shaft body.

The pulley holder having the above stated structure is suitable to be employed in a drive transmission mechanism in which a belt is stretched between a first pulley (driving pulley) connected to a driving source and a second pulley (driven pulley) and the pulley holder is used for supporting the second pulley (driven pulley) in a freely rotatable manner.

Further, the pulley holder having the above stated structure is suitable to be employed in an ink jet type image recording apparatus in which a belt is stretched between a first pulley (driving pulley) for supplying a driving force to a carriage on which an ink jet recording head is mounted and a second pulley (driven pulley) and the pulley holder is used for supporting the second pulley (driven pulley) in a freely rotatable manner.

The above and further objects and features of the invention will more fully be apparent from the following detailed description with accompanying drawings.

BRIEF DESCRIPTION OF THE SEVERAL VIEWS OF THE DRAWINGS

FIGS. 1A and 1B are a plan view and a front view illustrating a known drive transmission mechanism, respectively;

FIGS. 16A, 16B and 16C are outer appearances illustrating a front shape and side shapes of the holder body, respectively;

FIGS. 18A, 18B and 18C are views of outer appearance of a shaft viewing from three different directions;

DETAILED DESCRIPTION OF THE EXEMPLARY EMBODIMENTS

The present invention will be described below with reference to drawings illustrating embodiments of the present invention. In addition, it should be appreciated that the following embodiments are mere examples, and thus modifications of the embodiments are possible without departing from the purpose of the present invention.

Figure 2A:
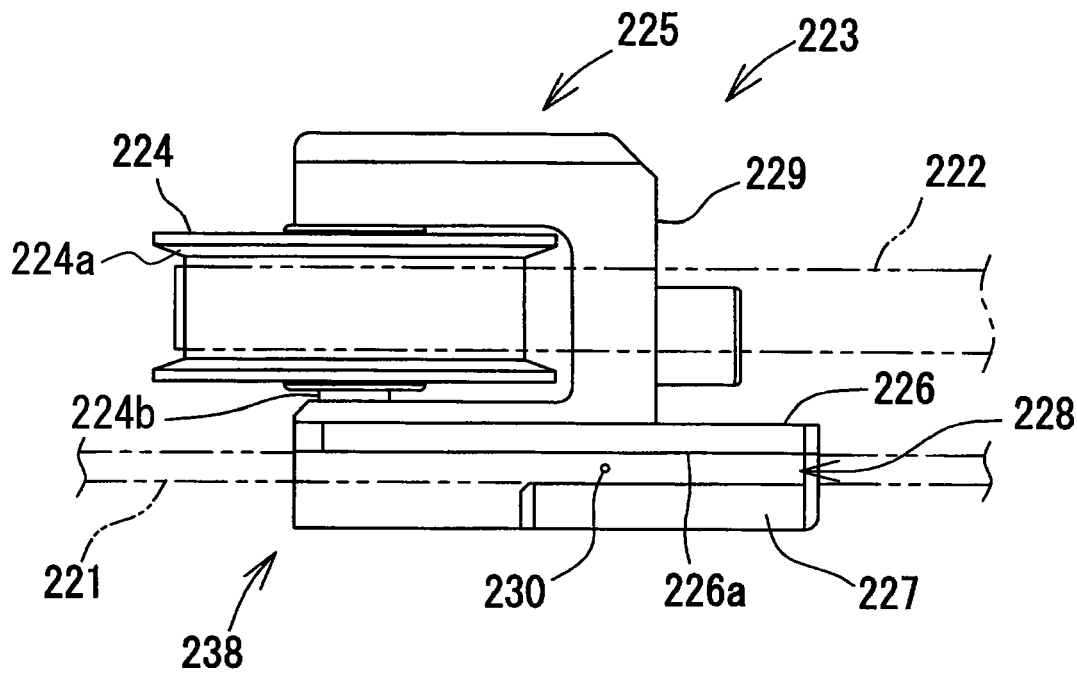
FIGS. 2A and 2B are enlarged detailed views of a known driven pulley unit, respectively.
Figure 2B:
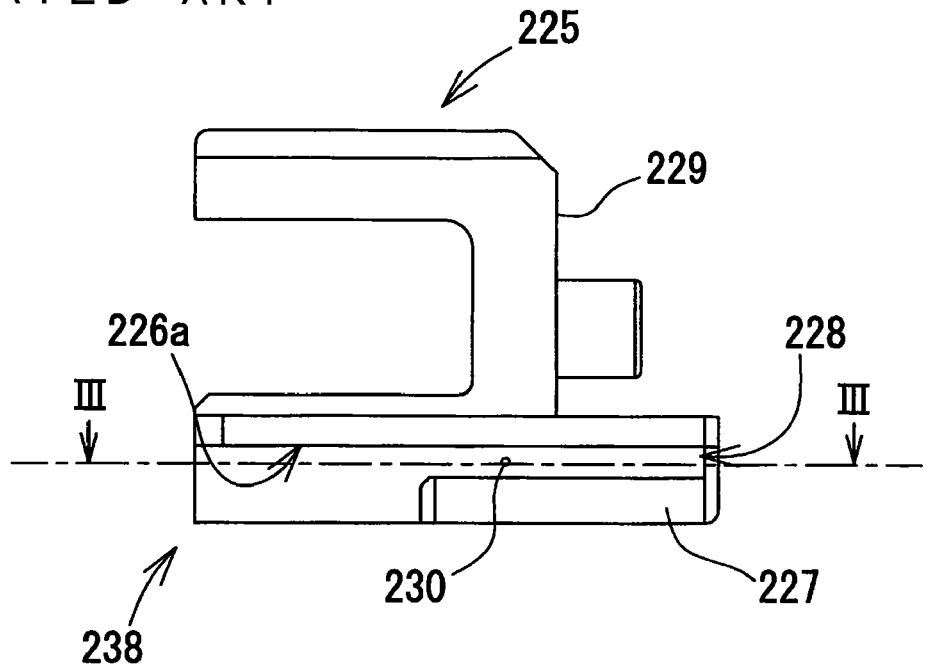
Figure 3:
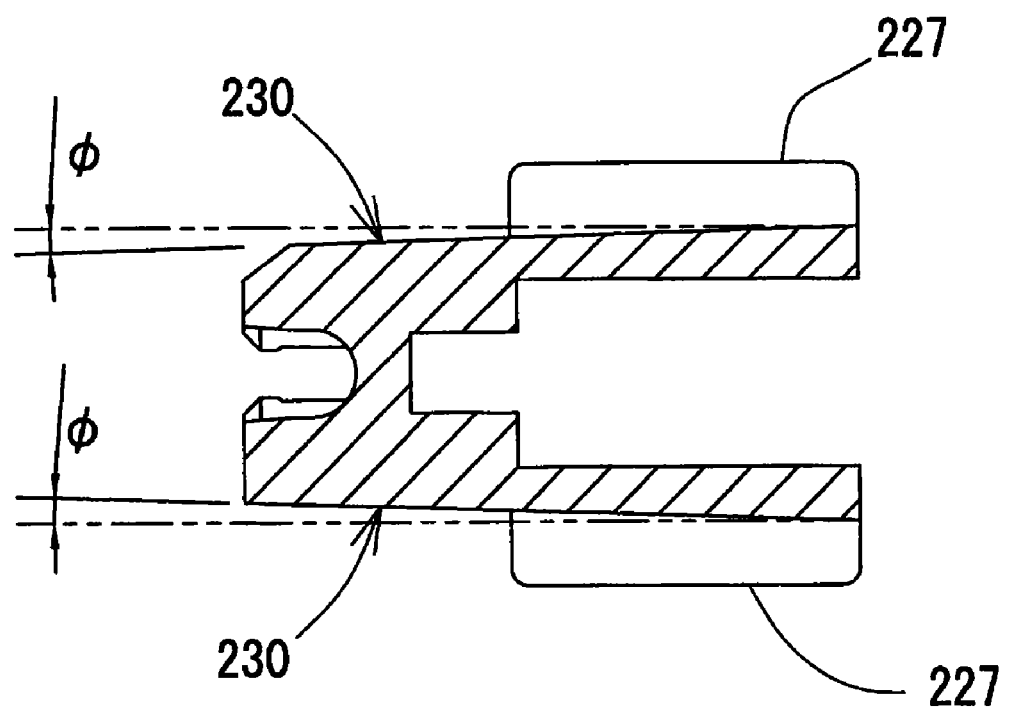
FIG. 3 is a cross sectional view of FIG. 2B taken along a line III-III.
Figure 4:
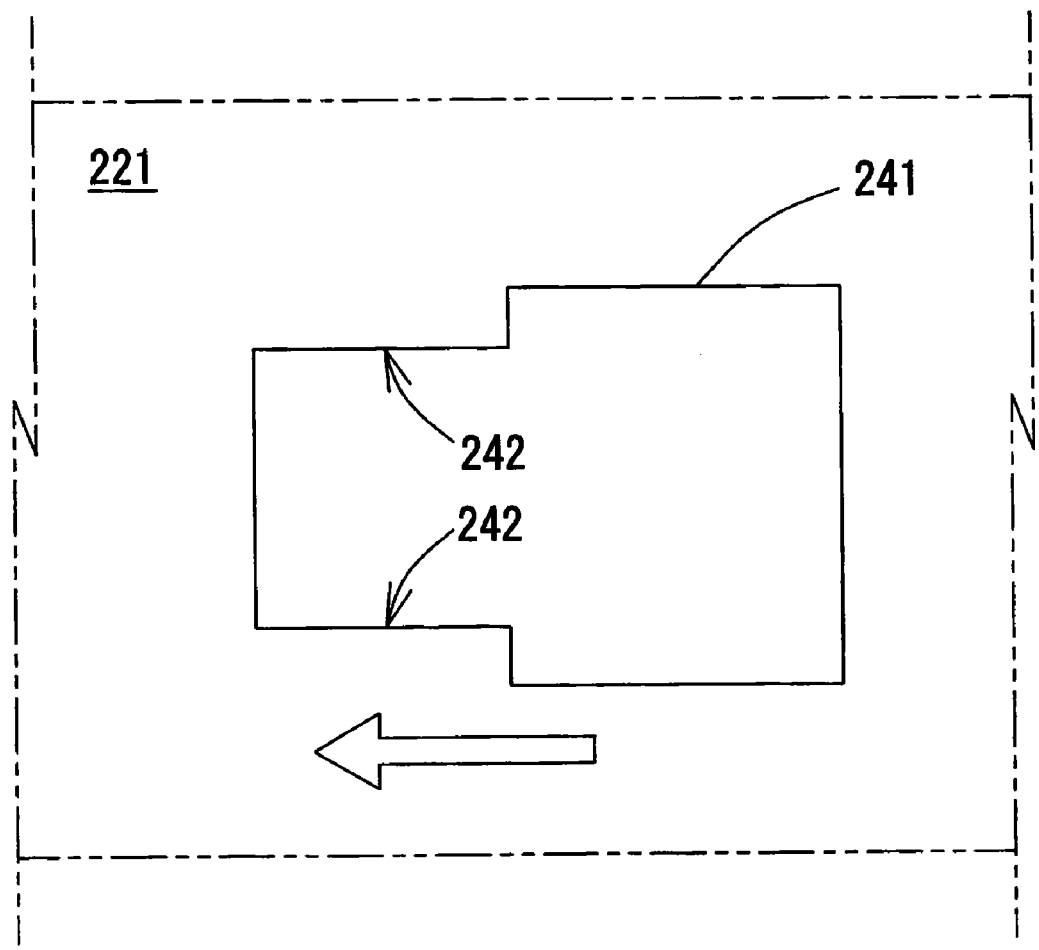
FIG. 4 is an enlarged view illustrating a known insertion hole.
Figure 5:
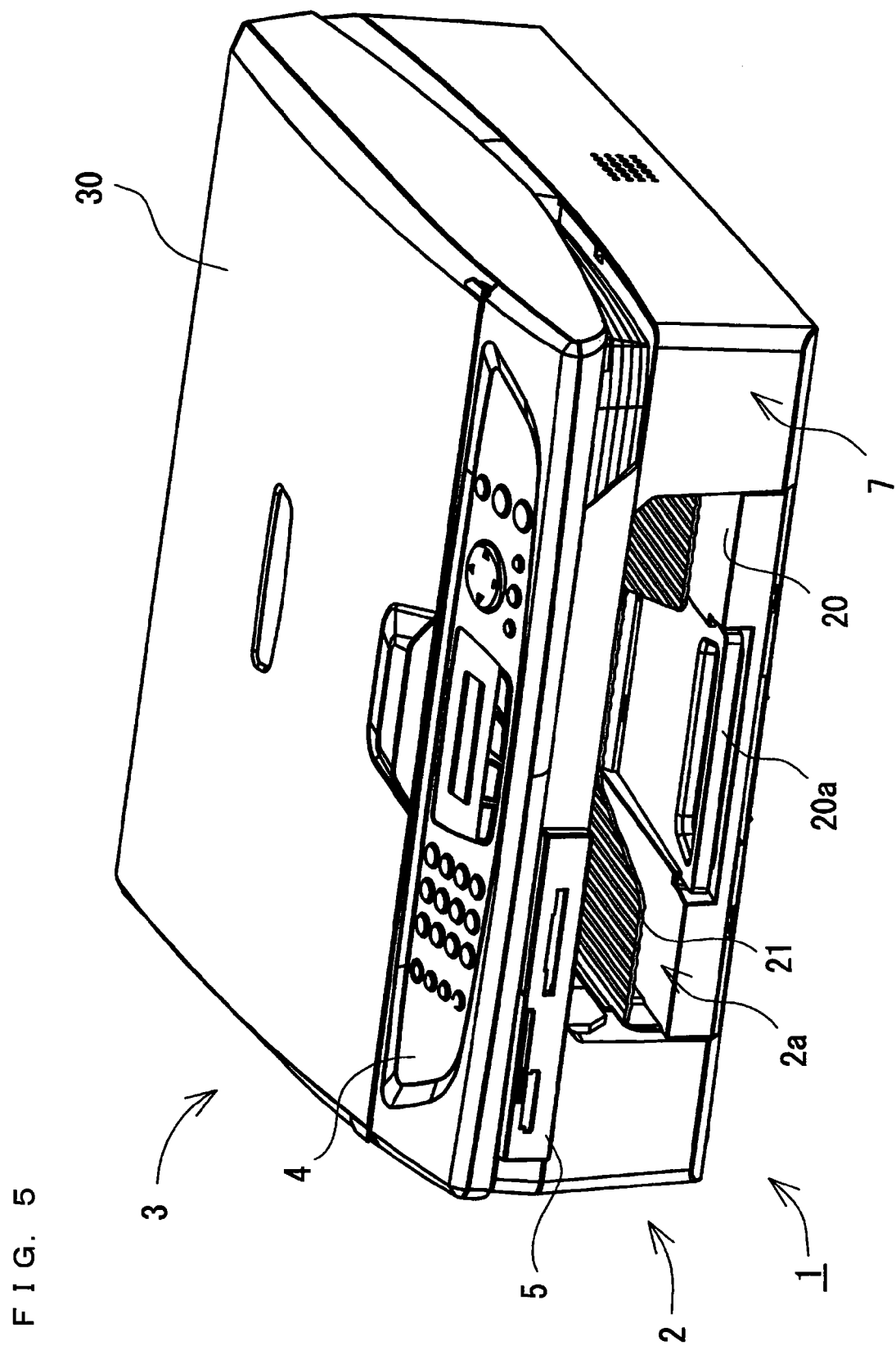
FIG. 5 is a perspective view illustrating an outer appearance of a multi-function apparatus according to an embodiment of the present invention.
Figure 6:
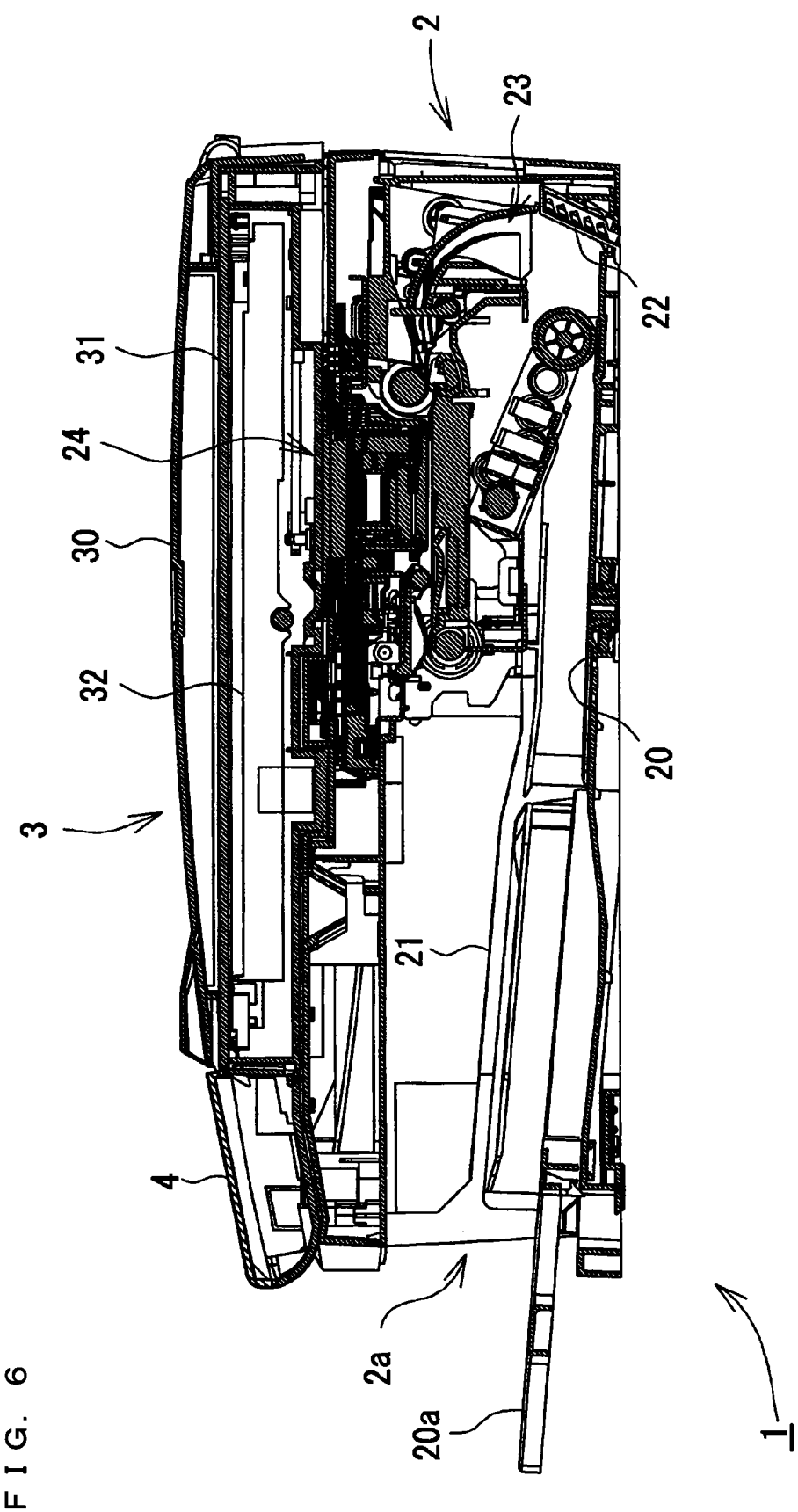
FIG. 6 is a longitudinal cross sectional view illustrating an inner structure of the multi-function apparatus.

FIG. 5 illustrates an outer appearance of a multi-function apparatus 1. FIG. 6 is a longitudinal cross sectional view illustrating an inner structure of the multi-function apparatus 1. The multi-function apparatus 1 is a MFD (Multi Function Device) including a printer unit 2 at a lower part and a scanner unit 3 at an upper part thereof in an integral manner, and has a printer function, a scanner function, a copying machine function, and a facsimile machine function. The printer unit 2 of the multi-function apparatus 1 corresponds to an image recording apparatus. Therefore, the functions other than the printer function are optional, namely, the present invention can be a single function printer as the image recording apparatus without the scanner unit 3 which does not have the scanner function or the copying function.

The printer unit 2 of the multi-function apparatus 1 is connected to an external information device such as a computer and thereby records an image and a document on a recording paper (record medium) on the basis of a recording data containing an image data and a document data received from the computer or the like. In addition, the multi-function apparatus 1 may be connected to a digital camera or the like in order to record the image data output from a digital camera or the like on the recording paper, or may be provided with a storage media such as a memory card in order to record the image data stored in the storage media on the recording paper.

As illustrated in FIG. 5, the multi-function apparatus 1 has a generally rectangular shape of a wide-and-thin type, namely, an appearance having a width and a depth larger than a height thereof, and further has the printer unit 2 at the lower part thereof. The printer unit 2 is provided with a rectangular opening 2a at a front surface. A paper feeding tray 20 and a paper discharging tray 21 are provided inside the opening 2a such that they are in tiers in an up-and-down direction. The paper feeding tray 20 stores a stack of paper, namely, a stack of recording paper of various sizes such as a paper size of B5 which is smaller than a paper size of A4 and a postcard size. The paper feeding tray 20, as illustrated in FIG. 6, can be enlarged of its tray surface by withdrawing a sliding tray 20a as required, and therefore the record medium, for example, of a legal size, can be stored therein. The recording paper stored in the paper feeding tray 20 is fed into the printer unit 2 to be recorded thereon with a predetermined image and is finally discharged to the paper discharge tray 21.

The upper part of the multi-function apparatus 1 is the scanner unit 3, which is so-called as a flat bed scanner. As illustrated in FIGS. 5 and 6, a platen glass 31 and an image sensor 32 are provided below a draft cover 30 as a top board of multi-function apparatus 1 in an opening/closing manner. A sheet of draft to be read of an image thereon is placed on the platen glass 31. There is the image sensor 32 of which main scanning direction is a depth direction (a horizontal direction in FIG. 6) of the multi-function apparatus 1 below the platen glass 31 such that the image sensor 32 is movable in a to and fro direction with regard to a width direction of the multi-function apparatus 1 (in a perpendicular direction to the drawing sheet surface of FIG. 6).

An upper part on the front surface of the multi-function apparatus 1 is provided with an operation panel 4 for operating the printer unit 2 and the scanner unit 3. The operation panel 4 has various operation buttons and a liquid crystal display. The multi-function apparatus 1 is operated on the basis of an operation command from the operation panel 4. When the multi-function apparatus 1 is connected to an external computer, the multi-function apparatus 1 is also operated on the basis of commands sent from a computer through a printer driver or a scanner driver. A slot unit 5 is provided on an upper left part of the front surface of the multi-function apparatus 1. The slot unit 5 can receive therein various kinds of compact size memory cards as memory devices. A predetermined operation at the operation panel 4 enables a reading of an image data stored in a compact size memory card inserted into the slot unit 5. Thus read information as to the image data is displayed on the liquid crystal display of the operation panel 4 and a predetermined image can be recorded on the recording paper by the printer unit 2 on the basis of this displayed information.

An internal structure of the multi-function apparatus 1 will be explained hereinafter with reference to FIGS. 5 to 14. More specifically, a structure of the printer unit 2 will be explained. As illustrated in FIG. 6, the paper feeding tray 20 is provided in the bottom of the multi-function apparatus 1 and an inclined separation plate 22 is provided in an innermost position of the paper feeding tray 20. The inclined separation plate 22 serves to separate multi-fed recording papers from the paper feeding tray 20 to guide only the recording paper of the uppermost position to an upstream of a paper conveying path 23. The paper conveying path 23 advances upwardly from the inclined separation plate 22, turns toward the front side of the multi-function apparatus 1 and further toward the front side from a rear side of the multi-function apparatus 1, and finally reaches the paper discharging tray 21 through an image recording unit 24. Therefore, the recording paper contained in the paper feeding tray 20 is guided along the paper conveying path 23 from a lower position to an upper position in such a manner that the recording paper turns around in U-letter shape to reach the image recording unit 24. Then, the recording paper is provided with an image recording by the image recording unit 24 and is discharged to the paper discharging tray 21.

Figure 7:
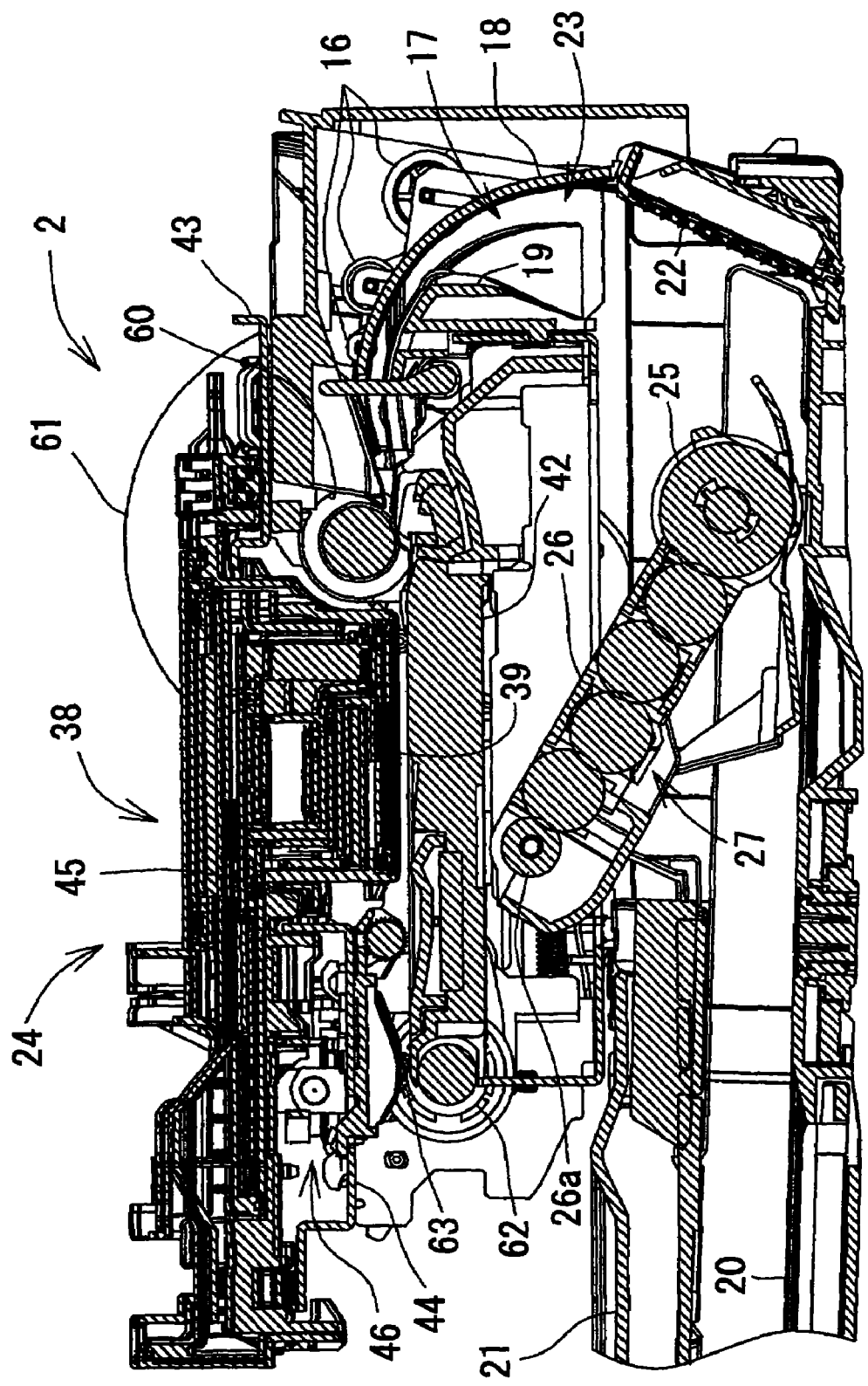
FIG. 7 is an enlarged cross sectional view illustrating a main structure of a printer unit.
Figure 8:
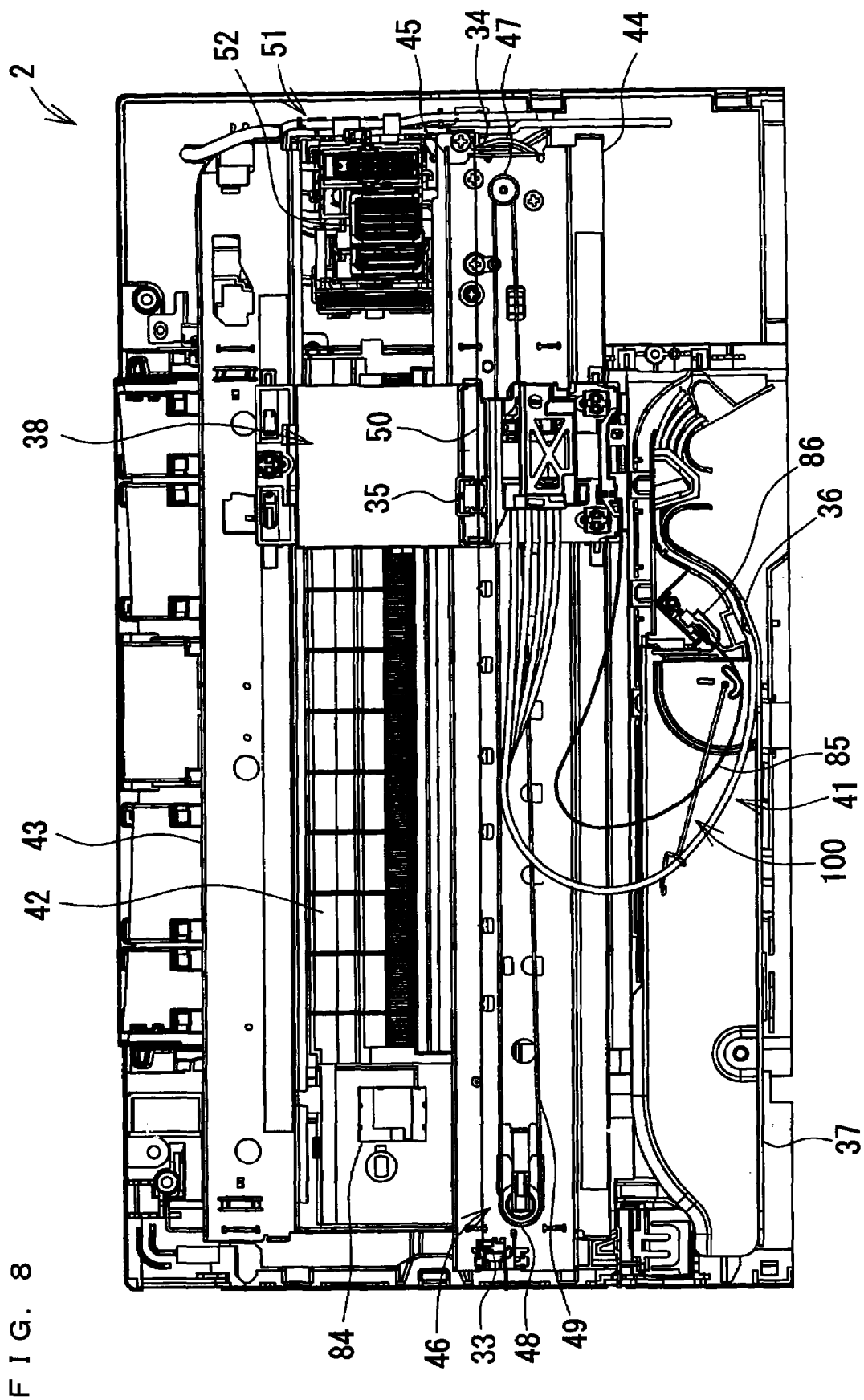
FIG. 8 is a plan view illustrating a main structure of a printer unit.

FIG. 7 is a partially enlarged cross sectional view illustrating a main structure of the printer unit 2. FIG. 8 is a plan view illustrating a main structure of the printer unit 2, in which a structure around an area from about a center of the printer unit 2 to a rear side of the apparatus. As illustrated in FIG. 7, a paper supplying roller 25 that supplies the recording paper piled in the paper feeding tray 20 to the paper conveying path 23 is provided above the paper feeding tray 20. The paper supplying roller 25 is pivotably supported at a top end of a paper feeding arm 26. The paper supplying roller 25 receives a driving force of a LF motor 71 (see FIG. 14) to be rotated via a drive transmission mechanism 27 in which a plurality of gears are engaged to each other.

The paper feeding arm 26 is so arranged that a base shaft 26a serves as a rotation axis and moves in an up-and-down direction in such a manner that the paper feeding arm 26 is accessible to the paper feeding tray 20. The paper feeding arm 26, as illustrated in FIG. 7, is rotated into a lower part of the apparatus so as to be brought into contact with the paper feeding tray 20 by its own weight, a spring or the like. As such, when the paper feeding tray 20 is inserted into or withdrawn from the apparatus, the paper feeding arm 26 can escape to an upper side of the apparatus. Since the paper feeding arm 26 is rotated into the lower part of the apparatus, the paper supplying roller 25 pivotably supported at a top end thereof is brought into contact with the recording paper on the paper feeding tray 20. Under such condition, the paper supplying roller 25 is rotated, resulting in that the recording paper of the uppermost position is sent to the inclined separation plate 22 due to a friction force caused between a roller surface of the paper supplying roller 25 and the recording paper. The recording paper is guided upwardly, while a top end of the recording paper contacts the inclined separation plate 22, and is finally sent to the paper conveying path 23. When the recording paper of the uppermost position is sent by the paper supplying roller 25, there may be a case where a recording paper immediately below the recording paper of the uppermost position is simultaneously sent due to a friction and an electrostatic therebetween; however, such a recording paper will be stopped due to a contact with the inclined separation plate 22.

The paper conveying path 23, at an area other than areas where the image recording unit 24 or the like is arranged, is composed of an outer guiding surface and an inner guiding surface which face each other and spaced apart by a predetermined distance. For example, a curving part 17 of the paper conveying path 23 at a rear side of the multi-function apparatus 1 is so structured that an outer guiding member 18 and an inner guiding member 19 are secured to a frame of the apparatus. In the paper conveying path 23, more specifically, in an area where the paper conveying path 23 is curved, rotation rollers 16 are provided therewith in a freely rotatable manner in an axial direction that is the width direction of the paper conveying path 23, with the rotation rollers 16 being provided such that roller surfaces of the rollers are exposed to the outer guiding surface. The rotation rollers 16 which are freely rotatable enables a smooth conveying of the recording paper at the curved area of the paper conveying path 23 where the recording paper slide contacts the guiding surface.

The paper conveying path 23 is provided with the image recording unit 24 (see FIG. 6). The image recording unit 24, as illustrated in FIG. 7, includes a carriage 38 on which an ink jet recording head 39 (see FIG. 9) is mounted and which reciprocately moves in a main scanning direction. The ink jet recording head 39 is supplied with each color of inks of cyan (C), magenta (M), yellow (Y), and black (Bk) through ink tubes 41 (see FIG. 8) from ink cartridges arranged in the multi-function apparatus 1 but independently from the ink jet recording head 39. While the carriage 38 moves in a to and fro direction, minute ink droplets of color inks are selectively ejected from the ink jet recording head 39, respectively, to record an image on a recording paper that is conveyed over a platen 42. In addition, FIGS. 7 and 8 do not show ink cartridges containing individual color inks.

Figure 9:
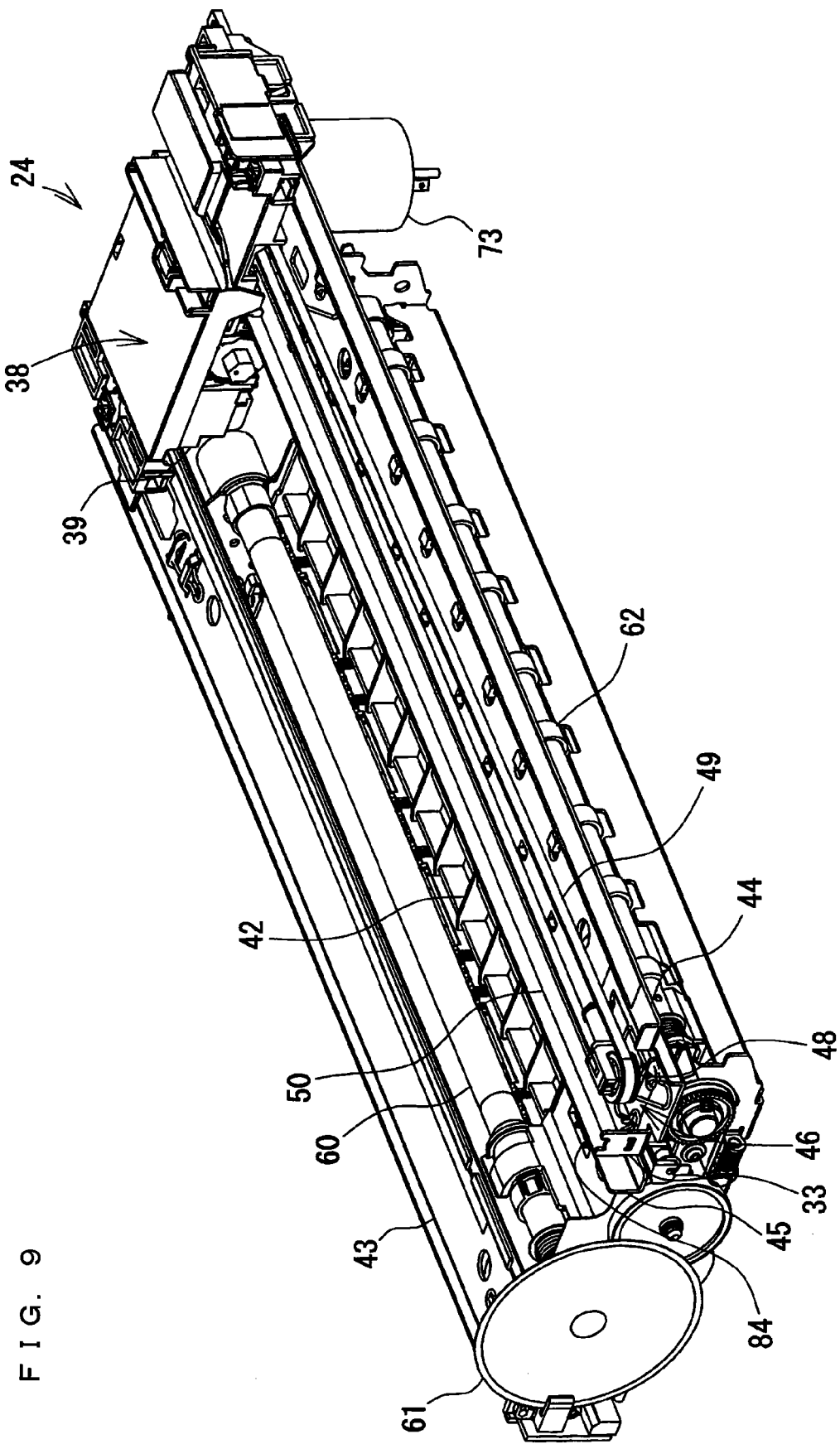
FIG. 9 is a perspective view illustrating a mechanism in the vicinity of an image recording unit.

FIG. 9 is a perspective view illustrating a mechanism around the image recording unit 24, in which ink tubes 41 and flat cables 85 are omitted. As illustrated in FIGS. 8 and 9, a pair of guide rails 43, 44 extend in a direction orthogonal to a direction in which the recording paper is conveyed, with the guide rails being arranged above the paper conveying path 23 and spaced apart by a predetermined distance in the direction in which the recording paper is conveyed (in an up-to-down direction in FIG. 8). The guide rails 43, 44 are provided within a housing of the printer unit 2 to compose a part of the frame that supports members of recorder unit 2. The carriage 38 is placed such that it bridges over the guide rails 43, 44 in a slidable manner in a direction orthogonal to the direction in which the recording paper is conveyed. Since the guide rails 43, 44 are arranged in a direction generally horizontal to the direction in which the recording paper is conveyed, a height of the printer unit 2 can be lowered to thereby realize a thinner apparatus.

The guide rail 43 arranged upstream in the direction in which the recording paper is conveyed has a plate shape in which a length in the width direction of the paper conveying path 23 (in the horizontal direction in FIG. 8) is longer than that of the reciprocate movement area by the carriage 38. The guide rail 44 arranged downstream of the direction in which the recording paper is conveyed has a plate shape in which a length in the width direction of the paper conveying path 23 is generally equal to that of the guide rail 43. An end part of the carriage 38 upstream in a paper conveying direction is placed on the guide rail 43, an end part of the carriage 38 downstream in the paper conveying direction is placed on the guide rail 44, and thereby the carriage 38 is slidable in a longitudinal direction of the guide rails 43, 44. An edge part 45 of the guide rail 44 upstream of the paper conveying direction is bent upwardly by approximately a right angle, as illustrated in FIG. 7. The carriage 38 carried by the guide rails 43, 44 holds the edge part 45 of the guide rail 44 in a slidable manner through a holding member such as a pair of rollers. Accordingly, the carriage 38 is positioned with regard to the direction in which the recording paper is conveyed, and is slidable in a direction orthogonal to the direction in which the recording paper is conveyed. In other words, the carriage 38 is slidably carried on the guide rails 43, 44 and moves reciprocately in a direction orthogonal to the direction in which the recording paper is conveyed along the edge part 45 of the guide rail 44. In addition, it is not illustrated in FIG. 7 or 8; however, the edge part 45 is applied with lubricant such as grease in order to help a smooth sliding of the carriage 38.

A belt driving mechanism 46 is provided on an upper surface of the guide rail 44. The belt driving mechanism 46 includes a driving pulley 47 and a driven pulley 48 which are provided around both ends of the recording paper conveying path 23 in the width direction, respectively, and an endless circular timing belt 49 which is provided with teeth inside thereof and is tensioned between the driving pulley 47 and the driven pulley 48. A driving force is applied from a CR motor 73 (see FIG. 9) to a shaft of the driving pulley 47 to allow the timing belt 49 for a circle movement in association with a rotation of the driving pulley 47. In addition, such a belt that both ends thereof are fixed to the carriage 38 may be employed instead of the endless timing belt 49.

Figure 10:
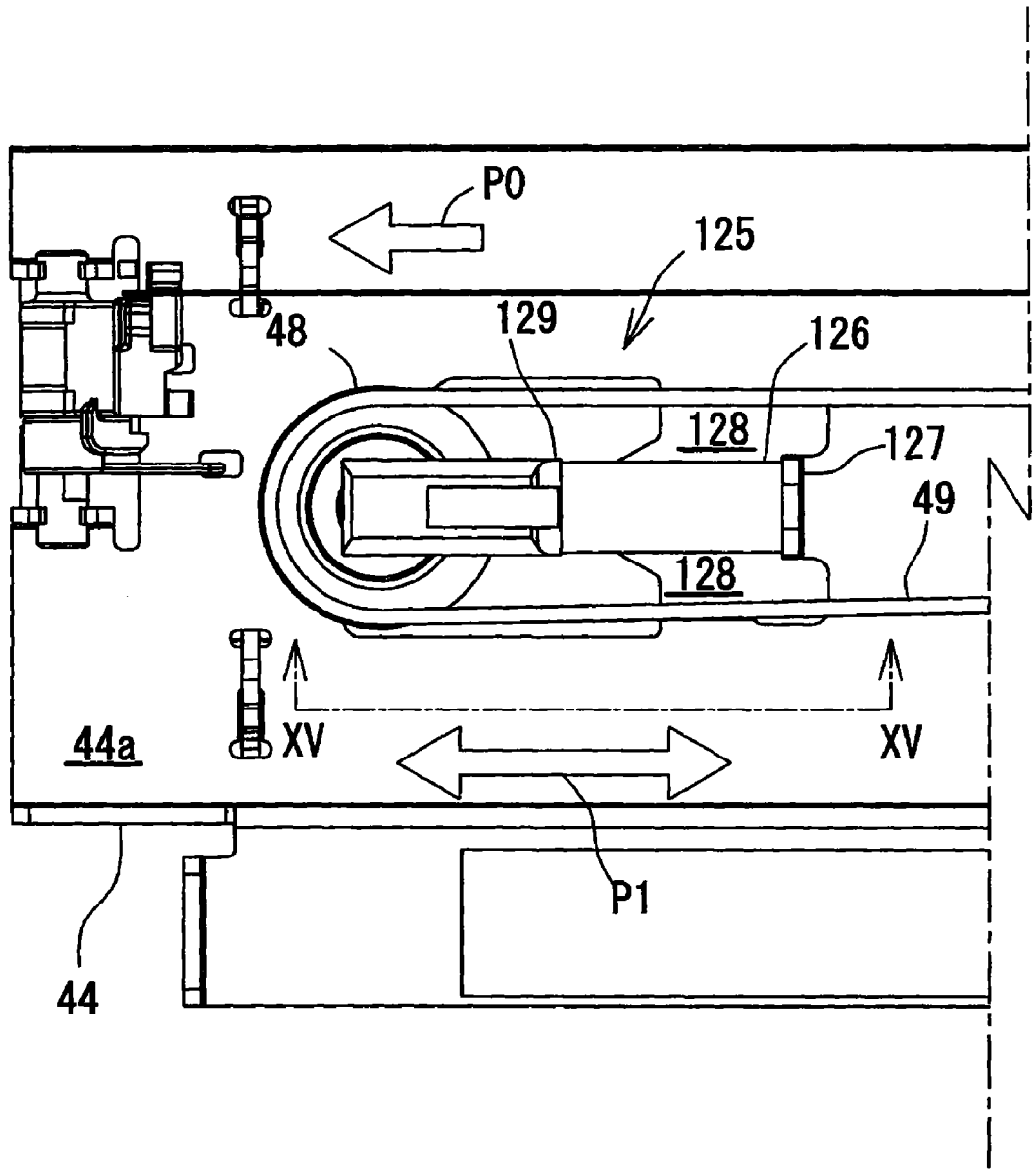
FIG. 10 is an enlarged view in the vicinity of a driven pulley.
Figure 11:
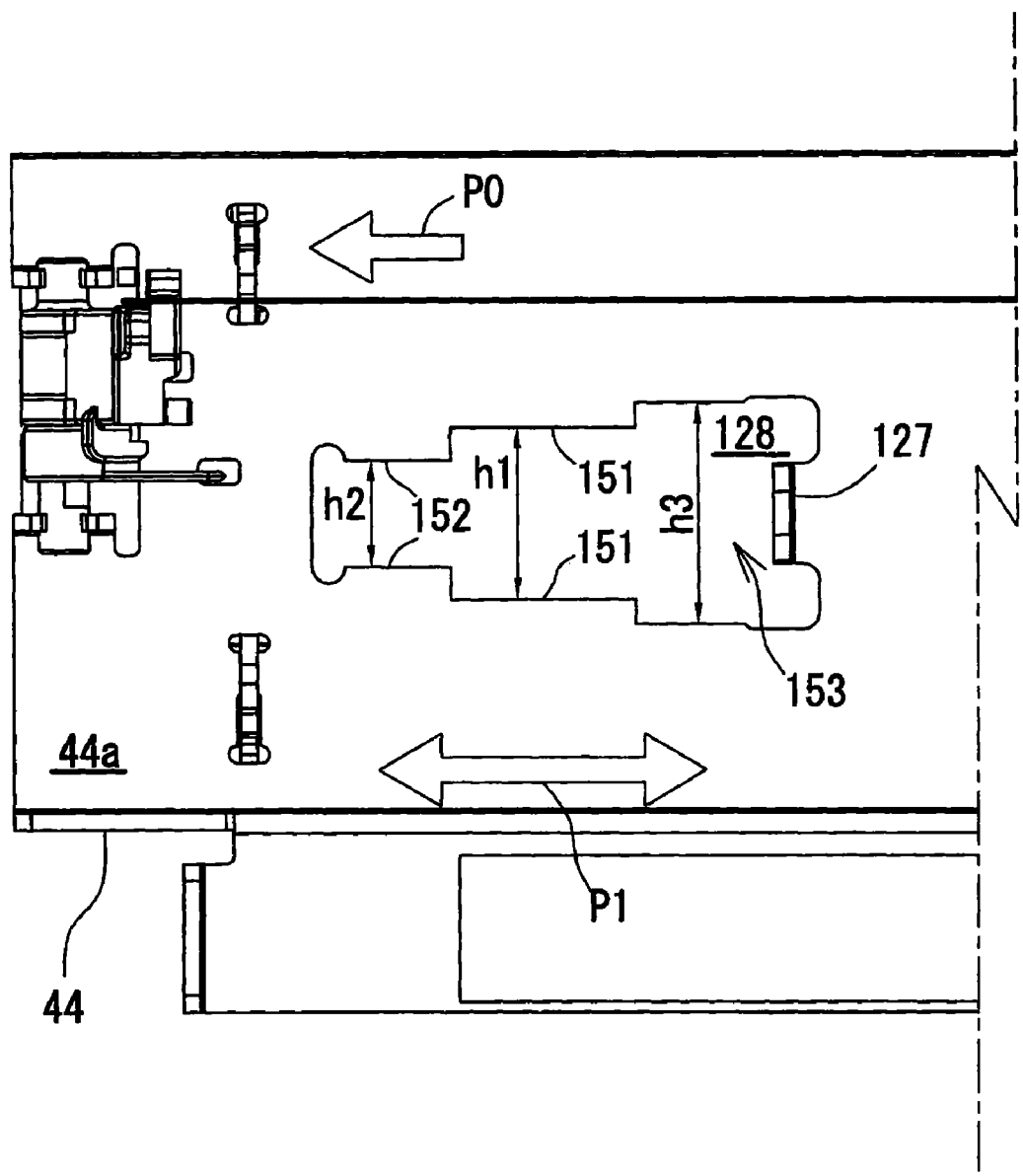
FIG. 11 is an enlarged view in the vicinity of a hole.

FIG. 10 is an enlarged view illustrating an area in the vicinity of the driven pulley 48. The driven pulley 48 is rotatably supported by a pulley holder 125 that is attached to the guide rail 44. The guide rail 44 is provided with a hole 128 formed therein, as illustrated in FIGS. 10 and 11. The hole 128 is used in order to secure the pulley holder 125 onto the guide rail 44. A standup plate 127 extends in a vertical direction from an upper surface 44a of the guide rail 44. This standup plate 127 is a bracket to be used when the pulley holder 125 that moves in such a direction that the timing belt 49 is wound (a direction as illustrated by an arrow P1 in FIG. 10) is elastically pressed toward such a direction that the timing belt 49 is tensioned by means of a coil spring 126. The hole 128 of the guide rail 44 serves to slidably support the pulley holder 125 in the arrow P1 direction. When a lower part 131 of the pulley holder 125 (see FIG. 15B) is inserted into the hole 128 and is slidably moved in such a direction that the timing belt 49 is tensioned, namely, in a left direction on the paper in FIG. 10 (in a direction of an arrow P0 in FIG. 10), first fitting parts 161 and second fitting parts 162 provided on the pulley holder 125, which will be explained below, (see FIG. 15B) are fit into the first edge parts 151 and the second edge parts 152 (see FIG. 11) of the hole 128. Under this condition, the coil spring 126 is attached between a spring receiving part 129 and the standup plate 127 provided in the pulley holder 125, with the coil spring 126 being pressed, and therefore, the pulley holder 125 is secured to the guide rail 44. In addition, a shape of the hole 128 formed in the guide rail 44 and a supporting structure of the pulley holder 125 in the guide rail 44 will be explained in detail later.

The carriage 38 is secured at the bottom surface thereof to the timing belt 49. Therefore, the carriage 38 is reciprocately moved on the guide rails 43, 44 along the edge part 45 thereof in association with the circular movement of the timing belt 49. The ink jet recording head 39 carried by such carriage 38 moves in the to and fro direction along a width direction of the recording paper conveying path 23 as the main scanning direction.

Figure 14:
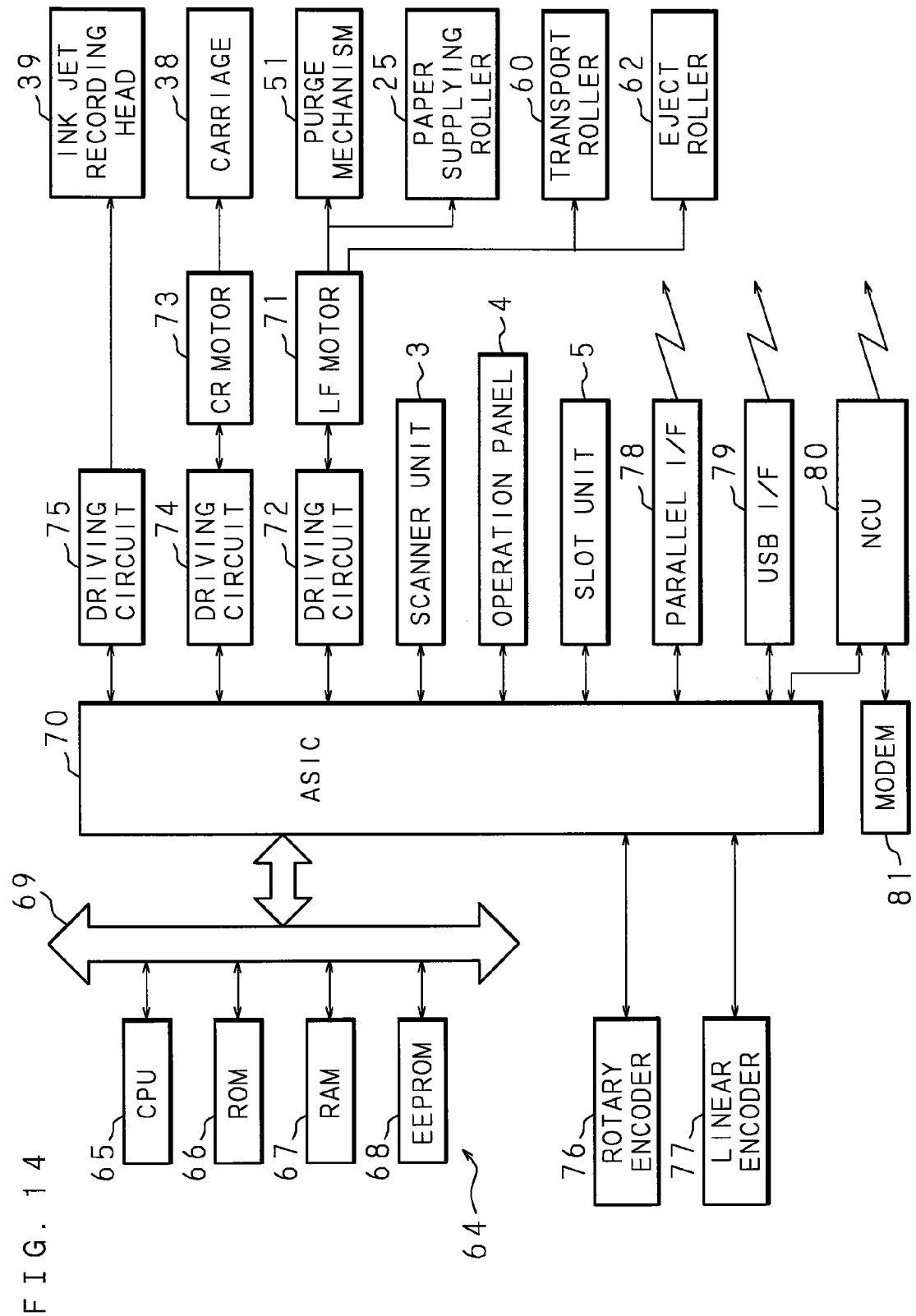
FIG. 14 is a block diagram illustrating a structure of a controlling unit of the multi-function apparatus.

The guide rail 44 is provided with an encoder strip 50 of a linear encoder 77 (see FIG. 14). The encoder strip 50 is a strip shaped one formed of a transparent resin. At both ends of the guide rail 44 in the width direction (in the to and fro direction of the carriage 38), a pair of supporting parts 33, 34 are formed thereon in such a manner that the supporting parts 33, 34 stand up from an upper surface of the ends of the guide rail 44. The both ends of the encoder strip 50 are retained by the supporting parts 33, 34 to be tensioned along the edge part 45. In addition, it is not illustrated in the drawings; however, one of the supporting parts 33, 34 is provided with a leaf spring, which retains an end part of the encoder strip 50. Owing to this leaf spring, a looseness of the encoder strip 50 due to an affect of the tension in a longitudinal direction can be prevented and, if an outer force is applied to the encoder strip 50, this leaf spring is elastically deformed to allow the encoder strip 50 to be flexed.

The encoder strip 50 is provided with such a pattern formed thereon that a transparent part which allows light to pass therethrough and a shielding part which blocks the light are arranged alternatively in a longitudinal direction by predetermined pitches. An optical sensor 35 as a translucent type sensor is provided at a position on an upper surface of the carriage 38 corresponding to the encoder strip 50. The optical sensor 35 moves in the to and fro direction along the longitudinal direction of the encoder strip 50 together with the carriage 38, and the pattern of the encoder strip 50 is detected upon the movement in the to and fro direction. The ink jet recording head 39 is provided with a head controlling substrate that controls an ink ejection. The head controlling substrate outputs a pulse signal based on a detected signal of the optical sensor 35, thereby judging a position and a speed of the carriage 38 on the basis of this pulse signal. As such, the movement in the to and fro direction of the carriage 38 can be controlled. In addition, since the head controlling substrate is covered by a head cover of the carriage 38, the head controlling substrate is not illustrated in FIGS. 8 and 9.

As illustrated in FIGS. 8 and 9, a platen 42 is arranged below the recording paper conveying path 23 in such a manner that the platen 42 faces the ink jet recording head 39. The platen 42 is arranged throughout a central part where the recording paper passes over in an area where the carriage 38 moves in the to and fro direction. A width of the platen 42 is sufficiently larger than a maximum width of the conveyable recording paper in a direction orthogonal to the recording paper conveying direction, and thus both ends of the recording paper always pass over the platen 42.

As illustrated in FIGS. 8 and 9, an area where the recording paper does not pass through, namely, an image unrecordable area by the ink jet recording head 39, includes a maintenance unit such as a purge mechanism 51 and a waste ink tray 84. The purge mechanism 51 serves to absorb and remove bubbles and foreign materials from nozzles 53 (see FIG. 12) of the ink jet recording head 39. The purge mechanism 51 includes a cap 52 that covers the nozzles 53 of the ink jet recording head 39, a pump mechanism connected to the ink jet recording head 39 through the cap 52, and a moving mechanism that allows the cap 52 to be attached to/detached from the nozzles 53 of the ink jet recording head 39. In addition, in FIGS. 8 and 9, the pump mechanism and the moving mechanism are arranged below the guide rail 44, and therefore are not shown in the drawings. When the bubbles and the like are absorbed and removed from the ink jet recording head 39, the carriage 38 is moved such that the ink jet recording head 39 is positioned over the cap 52. Under the condition, the cap 52 is moved upwardly to be attached to a lower surface of the ink jet recording head 39 in such a manner that the cap 52 seals the nozzles 53. Because of a creation of negative pressure within the cap 52 by means of the pump mechanism, ink is absorbed from the nozzles 53 of the ink jet recording head 39. The bubbles and foreign materials within the nozzles 53 are absorbed together with the ink.

The waste ink tray 84 receives an idle ejection, which is so-called as a flushing, of ink from the ink jet recording head 39. The waste ink tray 84 is formed on an upper surface of the platen 42, and within an area where the carriage 38 moves in the to and fro direction and the image unrecordable area. In addition, an inside of the waste ink tray 84 is covered with a sheet of felt, and therefore the flushed ink is absorbed by the felt to be held therein. Maintenance is performed by the maintenance unit as to removal of the bubbles and mixed inks, and prevention of dried condition within the ink jet recording head 39.

As illustrated in FIG. 5, a front surface of the housing of the printer unit 2 is provided with a freely openable door 7. In addition, FIG. 5 illustrates the door 7 in a closed condition. When the door 7 is opened, a cartridge mounting unit is exposed at a front side of the apparatus, and thus the ink cartridge can be inserted into/withdrawn from the apparatus. The cartridge mounting unit, which, however, is not illustrated in the drawings, is divided into four rooms corresponding to the number of the ink cartridges and the rooms receive ink cartridges containing inks of cyan, magenta, yellow and black, respectively. Four ink tubes 41 corresponding to each color of inks are arranged between the cartridge mounting unit and the carriage 38, as illustrated in FIG. 8. The ink jet recording head 39 carried by the carriage 38 is supplied with each color of inks from the ink cartridges mounted to the cartridge mounting unit through each of ink tubes 41.

The ink tubes 41 are made of synthetic resin and therefore have a flexibility according to the movement of the carriage 38 in the to and fro direction. Each ink tube 41 led out from the cartridge mounting unit is extended along the width direction of the apparatus to about a center thereof and is temporarily secured to a securing clip 36 of the apparatus body. Each ink tube 41 at its area between the securing clip 36 and the carriage 38 is not secured to the apparatus body or the like, and thus such area changes its position in accordance with the movement of the carriage 38 in the to and fro direction. In addition, in FIG. 8, the ink tubes 41 extending from the securing clip 36 to the cartridge mounting unit, not shown here, are omitted.

As illustrated in FIG. 8, the ink tube 41 of its area between the securing clip 36 and the carriage 38 extends so as to form a curved line that reverses its course in the to and fro direction of the carriage 38. In other words, the ink tube 41 extends so as to form a generally U-letter shape in a plan view. The four ink tubes 41 are arranged in a horizontal direction along the recording paper conveying direction in the carriage 38 to extend in the to and fro direction of the carriage 38. On the other hand, the four ink tubes 41 at the securing clip 36 are arranged and secured in a condition that the tubes 41 are piled up in a vertical direction. The securing clip 36 has an opening that opens upwardly and has a U-letter shape in its cross part. Each ink tube 41 is inserted into the opening to be piled up in the vertical direction, resulting in being held all together by the securing clip 36. Accordingly, the four ink tubes 41 are twisted so as to convert the arrangement in the horizontal direction into the arrangement in the vertical direction from the carriage 38 to the securing clip 36, resulting in being curved into generally U-letter shape viewing the entirety of four tubes.

Recording signals or the like are sent from a main substrate composing a controlling unit 64 (see FIG. 14) to a head controlling substrate of the ink jet recording head 39 through a flat cable 85. In addition, the main substrate is arranged at a front side of the apparatus (front side of FIG. 8), and thus is not shown in FIG. 8. The flat cable 85 of thin strip-shape is so formed that a plurality of conductive wires for transmitting electric signals are covered by a synthetic resin film such as a polyester film for an insulation thereof. The flat cable 85 serves to electrically connect the main substrate with the head controlling substrate, which are not shown here.

The flat cable 85 has a flexibility and thus is flexible in accordance with the reciprocate movement of the carriage 38. As illustrated in FIG. 8, the flat cable 85 at its area between the carriage 38 and the securing clip 36 extends so as to form a curved line, that traverses in the to and fro direction of the carriage 38. In other words, the flat cable 85 extends in such a manner that the flat cable 85 forms a generally U-letter shape in a plan view, provided that two sides of the thin strip-shaped flat cable is in a vertical direction. A direction in which the flat cable 85 extends from the carriage 38 and a direction in which the ink tubes 41 extend are the same directions with regard to the movement of the carriage 38 in the to and fro direction.

One end of the flat cable 85 secured to the carriage 38 is electrically connected to the head controlling substrate, which is not shown here, mounted on the carriage 38. The other end of the flat cable 85 secured to the securing clip 86 extends to the main substrate, which is not shown here, and is electrically connected thereto. The area of the flat cable 85 generally curved into U-letter shape is not secured to any member and changes its position in accordance with the reciprocate movement of the carriage 38 in a similar manner as the ink tubes 41. As stated above, the ink tubes 41 and the flat cable 85 that change their positions in accordance with the reciprocate movement of the carriage 38 are supported by a rotatable supporting member 100. The rotatable supporting member 100 is rotated in a generally horizontal direction in association with the change of the positions of the ink tubes 41 and the flat cables 85 to support them.

A restricting wall 37 extends in the width direction of the apparatus (in the horizontal direction in FIG. 8) at the front side of the apparatus viewing from the ink tubes 41 and the flat cable 85. The restricting wall 37 has a vertical wall that contacts the ink tubes 41, with the wall linearly standing up along the movement of the carriage 38 in the to and fro direction. The restricting wall 37 is provided in a direction in which the ink tubes 41 extend from the securing clip 36 that secures the ink tubes 41, and has a sufficient height so that all the four ink tubes 41 that are arranged in the vertical direction by the securing clip 36 can contact the restricting wall 37. The ink tubes 41 extend along the restricting wall 37 from the securing clip 36 to finally contact a surface of restricting wall 37 at a rear side of the apparatus, thereby preventing a projection of the ink tubes 41 toward the front side of the apparatus, namely, in a direction away from the carriage 38.

The securing clip 36 is provided around the central position of the apparatus in the width direction and secures the ink tubes 41 so as to allow the ink tubes 41 to extend toward the restricting wall 37. That is, an angle between the vertical wall surface of the restricting wall 37 and the direction in which the securing clip 36 allows the ink tubes 41 to extend takes a blunt angle smaller than 180 degrees in a plan view. The ink tubes 41 have a flexibility as well as a suitable bending rigidity, such that the extension with the angle of the ink tubes 41 by the securing clip 36 with regard to the restricting wall 37 urges the ink tubes 41 onto the wall surface of the restricting wall 37. Accordingly, in the area where the carriage 38 moves in the to and fro direction, an area where the ink tubes 41 are urged along the restricting wall 37 becomes larger, such that an area between the curved area of the ink tubes 41 and the carriage 38 that projects toward the rear side of the apparatus, namely, toward the carriage 38 can be reduced.

The securing clip 86 is arranged at a position in the vicinity of the center of the apparatus in the width direction and inside the curved area of the secured clip 36, and secures the flat cable 85 so as to allow the flat cable 85 to extend toward the restricting wall 37. That is, the vertical wall of the restricting wall 37 and the direction in which the securing clip 36 allows the flat cable 85 to extend takes a blunt angle smaller than 180 degrees in a plan view. The flat cable 85 has the flexibility as well as the suitable bending rigidity, such that the extension with the angle of the flat cable 85 by the securing clip 86 with regard to the restricting wall 37 urges the flat cable 85 onto the wall surface of the restricting wall 37. Accordingly, in the area where the carriage 38 moves in the to and fro direction, an area where the flat cable 85 is urged along the restricting wall 37 becomes larger, such that an area between the curved area of the flat cable 85 and the carriage 38 that projects toward the rear side of the apparatus, namely, toward the carriage 38 can be reduced.

Figure 12:
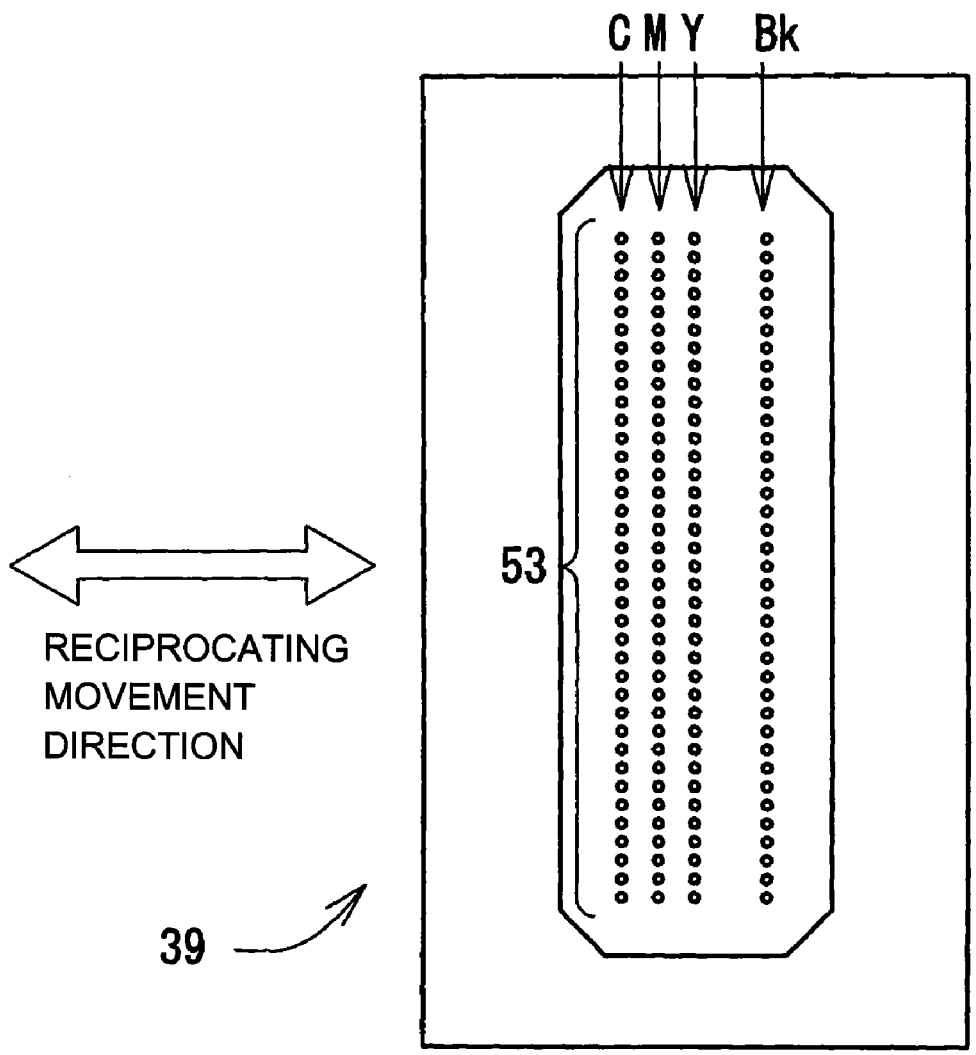
FIG. 12 is a bottom surface view illustrating a nozzle forming surface of an ink jet recording head.

FIG. 12 is a bottom surface view illustrating a nozzle forming surface of the ink jet recording head 39. The ink jet recording head 39 includes nozzles 53 on a lower surface thereof for cyan (C), magenta (M), yellow (Y), and black (Bk), respectively, with the nozzles 53 being aligned by color in the recording paper conveying direction. In addition, in FIG. 12, an up and down direction is the recording paper conveying direction and a horizontal direction is the reciprocating movement direction of the carriage 38. The nozzles 53 of the inks C, M, Y, Bk are aligned in the recording paper conveying direction, and the each nozzle 53 line of each of the color inks aligns in the reciprocating movement direction of the carriage 38. Pitches between the nozzles 53 and the number of nozzles 53 in the conveying direction can be set as required considering a resolution or the like of the recording image. Further, the number of the lines of the nozzles 53 can be changed in accordance with the number of kinds of the color inks.

Figure 13:
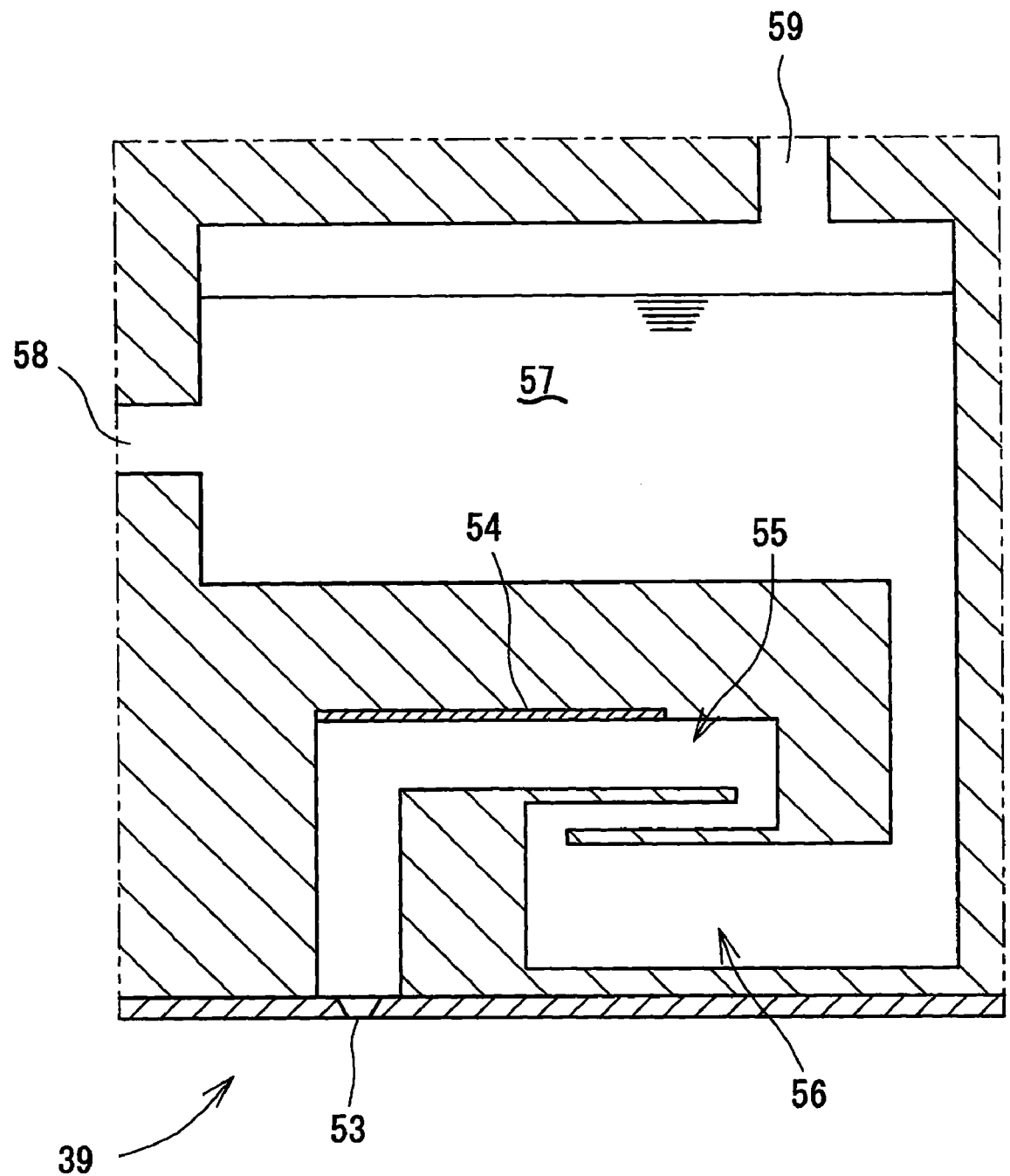
FIG. 13 is a schematic view illustrating an inner structure of the ink jet recording head.

FIG. 13 is a partially enlarged schematic cross sectional view illustrating an inner structure of the ink jet recording head 39. An upstream of the nozzles 53 formed on the lower surface of the ink jet recording head 39 is provided with a cavity 55 formed thereon with a piezo-electric element 54. The piezo-electric element 54 is deformed by being applied with a predetermined voltage to reduce a volume of the cavity 55. According to this change of volume of the cavity 55, the ink within the cavity 55 is ejected from the nozzles 53 in the form of ink droplets.

The cavity 55 is provided for each of the nozzles 53, and a manifold 56 is formed over a plurality of cavities 55. The manifold 56 is provided for each of the color inks C, M, Y, Bk. An upstream of the manifold 56 is provided with a buffer tank 57. The buffer tank 57 is provided for each of the color inks C, M, Y, Bk. Each buffer tank 57 is supplied through an ink supplying opening 58 with the ink distributing through the ink tube 41. Since the ink is once reserved in the buffer tank 57, the bubbles generated in the ink within the ink tube 41 or the like are trapped therein to prevent the bubbles to go into the cavity 55 and the manifold 56. The bubbles trapped within the buffer tank 57 are absorbed and removed by the pump mechanism through a bubble discharging opening 59. The ink supplied from the buffer tank 57 to the manifold 56 is divided to each cavity 55 by the manifold 56.

As stated above, an ink flow path is so structured that each color ink supplied from the ink cartridge through the ink tube 41 flows into the cavity 55 through the buffer tank 57 and the manifold 56. Each color ink C, M, Y, Bk supplied through such an ink flow path is ejected in the form of the ink droplet from the nozzles 53 onto the recording paper owing to the deformation of the piezo-electric element 54.

As illustrated in FIG. 7, an upstream of the image recording unit 24 is provided with a pair of transport roller 60 and a pinch roller. In FIG. 7, the pinch roller is not viewed since it is hidden by other members; however, the pinch roller is arranged in a pressurized manner below the transport roller 60. The transport roller 60 and the pinch roller pinch the recording paper therebetween while the recording paper is conveyed on the recording paper conveying path 23 finally to the platen 42. A downstream of the image recording unit 24 is provided with a pair of eject roller 62 and a spur roller 63. The eject roller 62 and the spur roller 63 nip the recording paper after being recorded to transport it to the paper discharging tray 21. The transport roller 60 and the eject roller 62 receive a driving force from the LF motor 71 (see FIG. 14) to perform an intermittent drive by a predetermined line feed width. The transport roller 60 rotates synchronized with the eject roller 62. A rotary encoder 76 (see FIG. 14) provided on the transport roller 60 detects by the optical sensor a pattern of an encoder disk 61 that rotates in association with the transport roller 60. On the basis of this detected signal, rotations of the transport roller 60 and the eject roller 62 are controlled.

The spur roller 63 contacts with the recording paper after it is recorded, such that a surface of the spur roller 63 is formed into irregularity of a spur shape so as not to have the image on the recording paper be deteriorated. The spur roller 63 is provided in a direction away from the eject roller 62 so as to be slidable, and urged by a coil spring so as to fit with the eject roller 62. When the recording paper enters into a gap between the eject roller 62 and the spur roller 63, the spur roller 63 retracts against the urging force by a thickness of the recording paper to hold the recording paper in such a manner that the recording paper is urged onto the eject roller 62. As such, the rotation force of the eject roller 62 can be reliably transmitted to the recording paper. The pinch roller is also provided in a similar manner with regard to the transport roller 60, such that the recording paper is held in press so as to contact with the transport roller 60, thereby transmitting the rotation force of the transport roller 60 to the recording paper in a reliable manner.

FIG. 14 is a block diagram illustrating a structure of the controlling unit 64 of the multi-function apparatus 1. The controlling unit 64 controls not only the printer unit 2 but also the entire behavior of the multi-function apparatus 1 including the scanner unit 3, and includes the main substrate to which the flat cable 85 is connected. In addition, since a structure of the scanner unit 3 is not a main structure of the present invention, a detailed explanation thereof is omitted here. The controlling unit 64 is structured as a micro computer that mainly includes CPU (Central Processing Unit) 65, ROM (Read Only Memory) 66, RAM (Random Access Memory) 67, and EEPROM (Electrically Erasable and Programmable ROM) 68 and is connected to the ASIC (Application Specific Integrated Circuit) 70 through a bus 69.

The ROM 66 stores a program or the like for controlling various behaviors of the multi-function apparatus 1. The RAM 67 is used as a memory area or a working area where various data, that are used when the CPU 65 executes the above stated program, are temporarily stored. Further, the EEPROM 68 stores settings and flags or the like to be saved even after the power is off.

The ASIC 70 generates an excitation signal or the like to be input to the LF (transmitting) motor 71 in response to a command from the CPU 65, the signal is applied to a driving circuit 72 of the LF motor 71, and the driving signal is input to the LF motor 71 through the driving circuit 72, thereby controlling the rotation of the LF motor 71. The driving circuit 72 causes the paper supplying roller 25, the transport roller 60, the eject roller 62, and the LF motor 71 connected to the purge mechanism 51 to drive and generates an electric signal for rotating the LF motor 71 upon receiving the output signal from the ASIC 70. The LF motor 71 rotates upon receiving this electric signal to transmit the rotation force of the LF motor 71 to the paper supplying roller 25, the transport roller 60, the eject roller 62 and the purge mechanism 51 through a known driving mechanism including gears, driving shafts or the like.

The ASIC 70 generates an excitation signal or the like to be output to the CR (carriage) motor 73 in response to the command from the CPU 65, this signal is applied to a driving circuit 74 of the CR motor 73, and the driving signal is output to the CR motor 73 through the driving circuit 74, thereby controlling the rotation of the CR motor 73. The driving circuit 74 causes the CR motor 73 to drive and generates the electric signal for rotating the CR motor 73 upon receiving the output signal from the ASIC 70. The CR motor 73 rotates upon receiving this electric signal, and the rotation force of the CR motor 73 is transmitted to the carriage 38 through the belt driving mechanism 46 to cause the carriage 38 to move in the to and fro direction. As such, the reciprocating movement of the carriage 38 is controlled by the controlling unit 64.

A driving circuit 75 selectively ejects each of the color inks onto the recording paper from the ink jet recording head 39 at a predetermined timing, receives the output signal generated in the ASIC 70 on the basis of a drive control step output from the CPU 65, and controls the ink jet recording head 39. This driving circuit 75 is mounted on the head controlling substrate. The flat cable 85 transmits the signal from the main substrate composing the controlling unit 64 to the head controlling substrate.

ASIC 70 is connected to the rotary encoder 76 for detecting a rotation amount of a driving roller 87 and the linear encoder 77 for detecting a position of the carriage 38. The carriage 38 is moved to one end of the guide rails 43, 44 when the power of the multi-function apparatus 1 is switched on, at which the position detected by the linear encoder 77 is initialized. When the carriage 38 moves on the guide rails 43, 44 from this initialized position, the optical sensor 35 provided on the carriage 38 detects a pattern of the encoder strip 50, and the number of pulse signals detected by the sensor is learned by the controlling unit 64 as a moving distance of the carriage 38. The controlling unit 64 controls the rotation of the CR Motor 73 in order to control the reciprocating movement of the carriage 38 on the basis of this moving distance.

ASIC 70 is connected to the scanner unit 3, the operation panel 4 for sending operation command of the multi-function apparatus 1, the slot unit 5 to which various compact size memory cards are inserted, a parallel interface 78 and a USB interface 79 for performing a send and receive of data with the external information equipment such as a personal computer through a parallel cable and a USB cable, and so on. Further, the ASIC 70 is connected to a NCU (Network Control Unit) 80 and a modem (MODEM) 81 in order to realize the facsimile function.

Figure 15A:
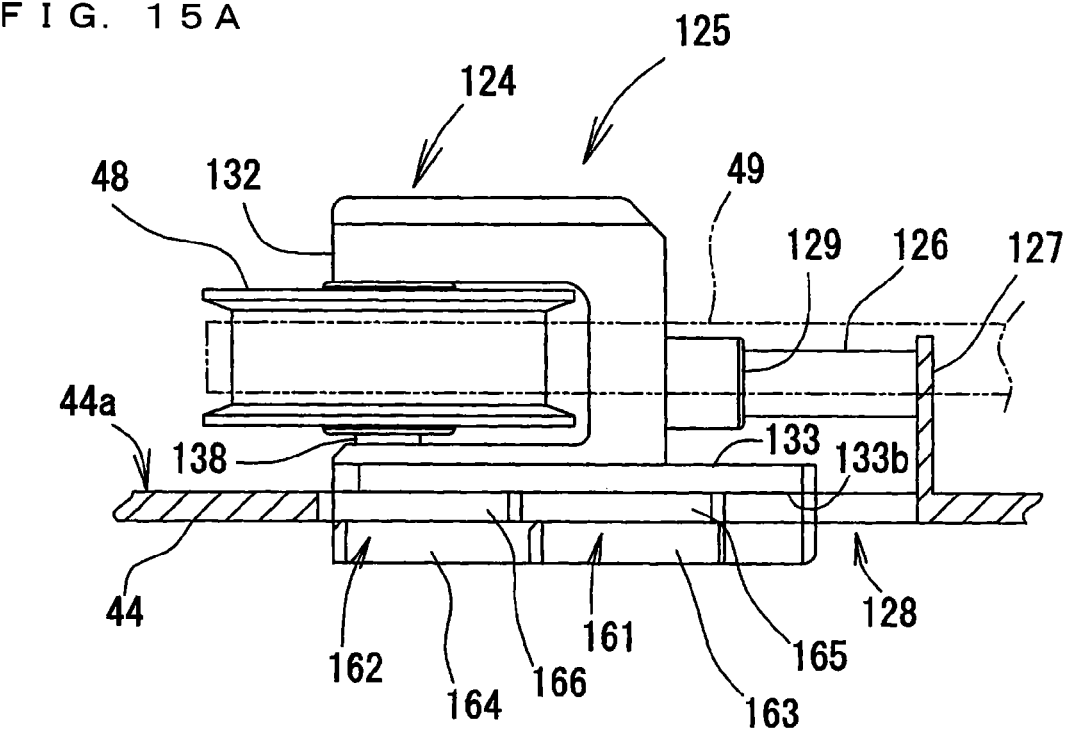
FIGS. 15A and 15B are cross sectional views illustrating essential parts viewing from XV-XV direction of FIG. 10.
Figure 15B:
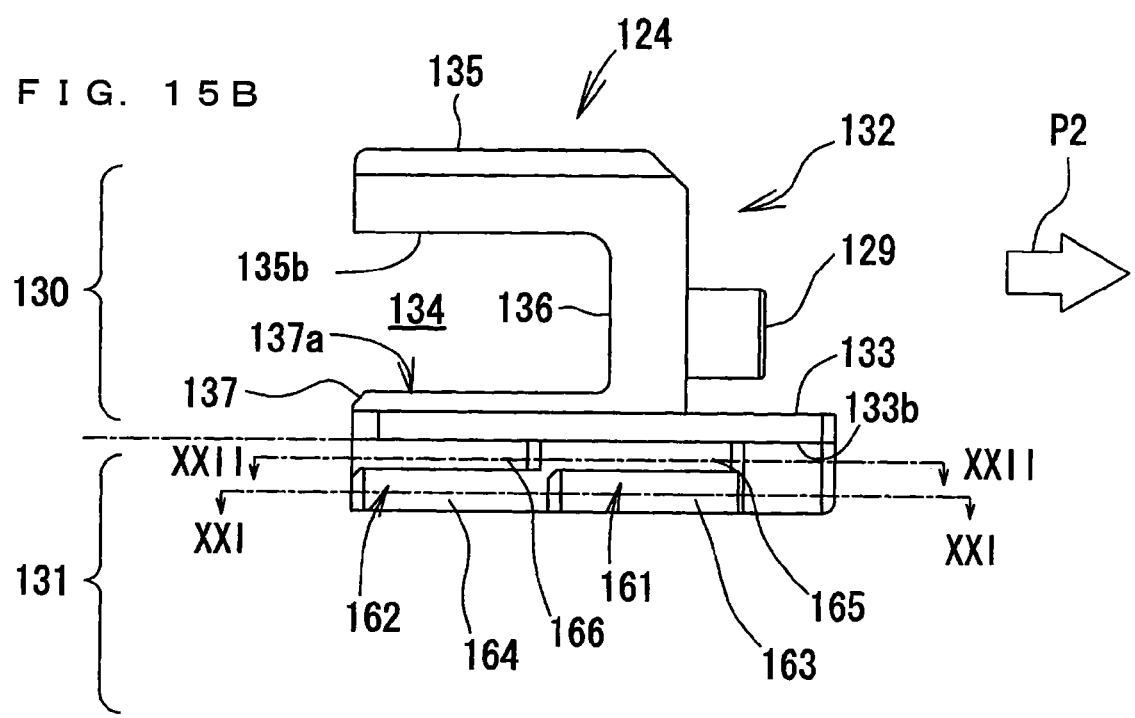
Figure 17:
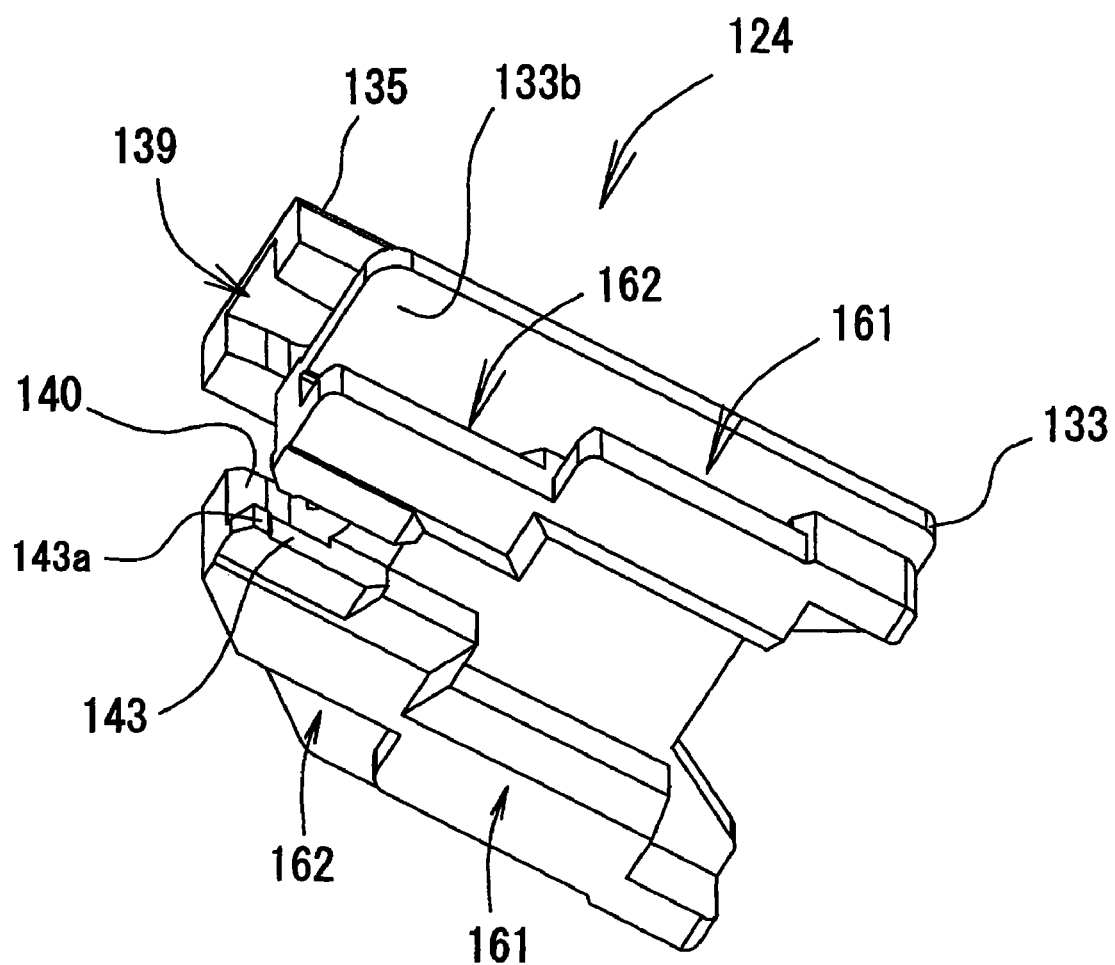
FIG. 17 is a perspective view of the holder body viewing obliquely from a lower direction.
Figure 19:
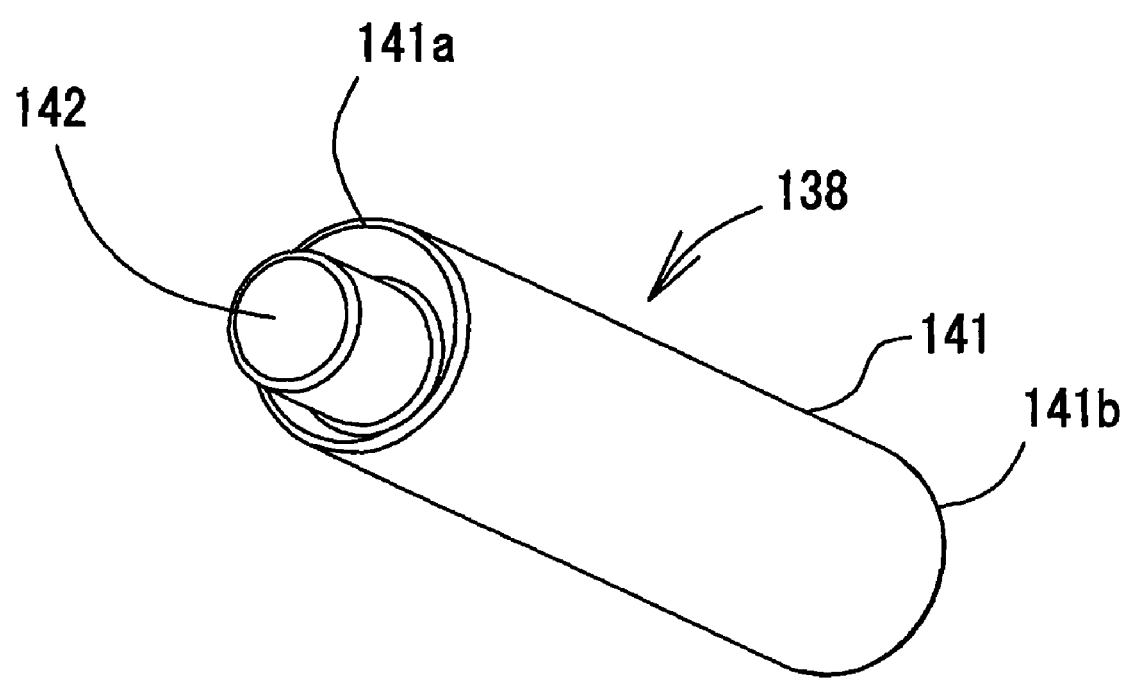
FIG. 19 is an enlarged perspective view of the shaft.
Figure 20A:
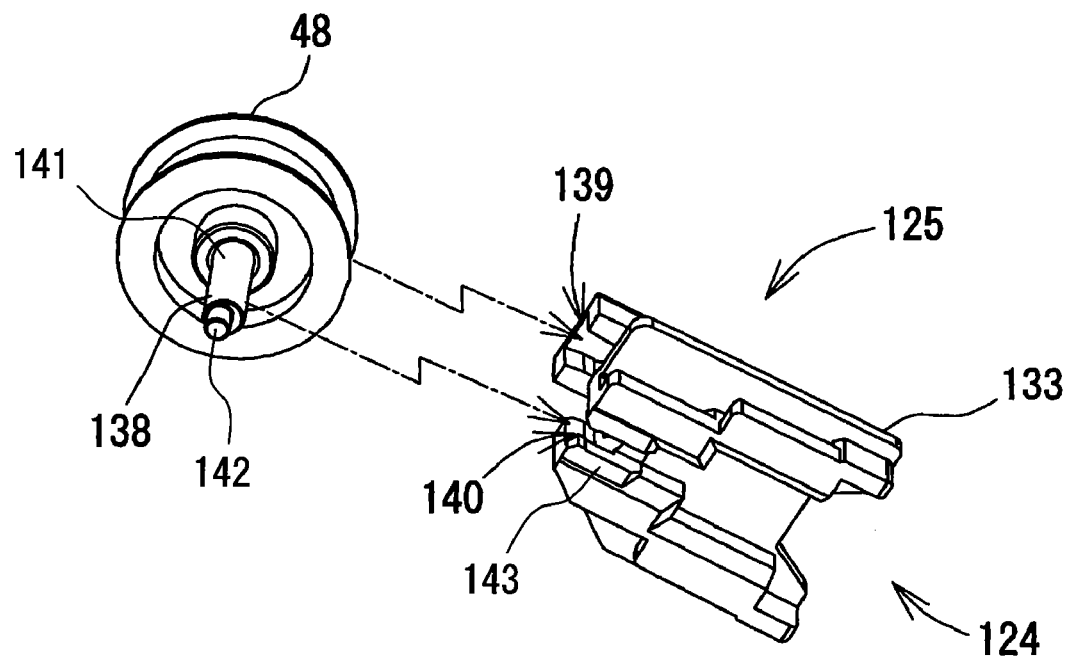
FIGS. 20A and 20B are exploded perspective views explaining an assembly structure of the driven pulley.
Figure 20B:
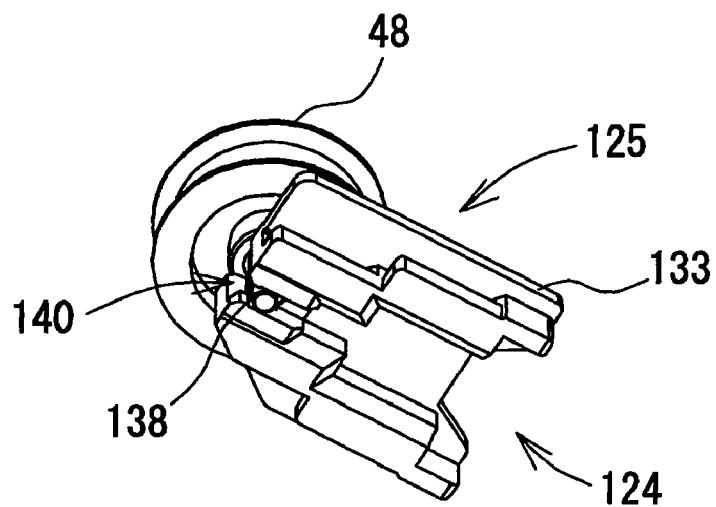
Figure 21:
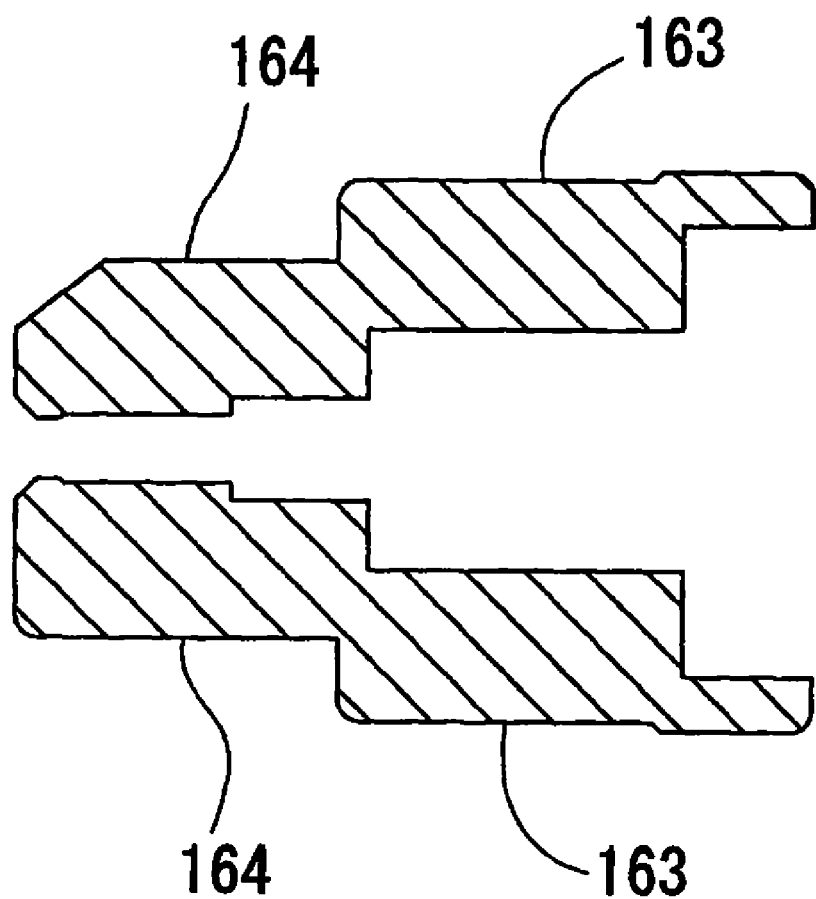
FIG. 21 is a cross sectional view of FIG. 15B taken along a line XXI-XXI.
Figure 22:
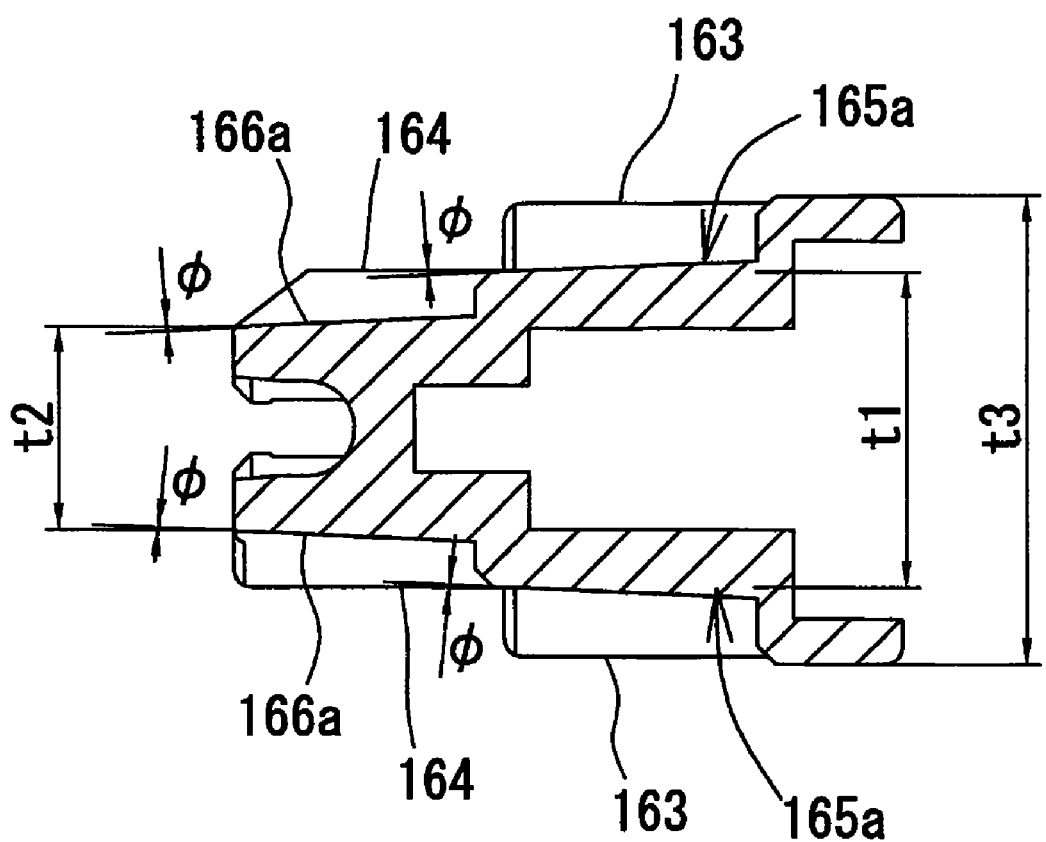
FIG. 22 is a cross sectional view of FIG. 15B taken along a line XXII-XXII.

Detailed explanation will be given hereinafter as to a supporting structure of the driven pulley 48 and a supporting structure of the pulley holder 125 with reference to FIGS. 15 to 22. Here, FIGS. 15A and 15B are cross sectional views of the essential parts viewing from XV-XV direction on FIG. 10. FIGS. 16A, 16B and 16C are outer appearances illustrating a front shape and side shapes of a holder body 124, respectively. FIG. 17 is a perspective view of the holder body 124 viewing obliquely from a lower direction. FIGS. 18A, 18B and 18C are views of outer appearance of a shaft 138 of the pulley holder 125 viewing from three different directions. FIG. 19 is an enlarged perspective view of the shaft 138. FIGS. 20A and 20B are exploded perspective views explaining an assembly structure of the driven pulley 48. FIG. 21 is a cross sectional view of FIG. 15 taken along a line XXI-XXI. FIG. 22 is a cross sectional view of FIG. 15B taken along a line XXII-XXII.

The pulley holder 125 includes the holder body 124 and the shaft 138. The holder body 124 is formed of a synthetic resin such as ABS resin, acrylic resin (methylmethacrylate), polypropylene (PP), polycarbonate (PC), polyacetal (POM), and polybutylene terephthalate (PBT) by using a die. In addition, a general die molding is exemplified by an injection molding; however, other molding method is also available here. Further, a metal die is generally used; however, any die is available as far as it is suitable for molding the pulley holder 125, namely, a glass die, a resin die, a ceramic die and others. In the die molding of the holder body 124, a predetermined draft angle is taken for the sake of an easy releasing of the holder body 124 from the die. According to the present embodiment, the holder body 124 is formed, with an approximate right end portion of FIG. 15B being as a parting line. Therefore, the holder body 124 is withdrawn toward a right side of FIG. 15B (toward a direction of an arrow P2 in FIG. 15B), and therefore, draft angles of about ½-2 degrees are formed into a tapered shape from the right to the left of the holder body 124 in FIG. 15B.

As illustrated in FIGS. 15B, 16A, 16B and 16C, the holder body 124 generally includes an upper part 130 which appears upward from an upper surface 44a of the guide rail 44 and a lower part 131 which is inserted into the hole 128 provided in the guide rail 44 (see FIG. 11). Here, FIG. 16A is a left side view of the holder body 124 as illustrated in FIGS. 15A and 15B. FIG. 16B is a front view of the holder body 124. FIG. 16C is a right side view of the holder body 124.

The upper part 130 of the holder body 124 includes a base 133 with which contacts the upper surface 44a of the guide rail 44 when the lower part 131 of the holder body 124 is inserted into the hole 128, and a support arm 132 which stands up in the upward vertical direction from the base 133. The support arm 132 has a channel shape when viewing it from a front. More specifically, the support arm 132 is formed continuously with the base 133 to finally form the channel shape in a combination of an arm lower part 137 which extends in parallel with an upper surface of the base 133, an arm base 136 extending upward from one end of the arm lower part 137, and an arm upper part 135 extending from the upper end of the arm base 136 in a direction in which the arm lower part 137 extends. An inner space 134 enclosed by the arm upper part 135, the arm base 136, and the arm lower part 137, namely, the inner space 134 of the support arm 132 having a channel shape includes therein the driven pulley 48 (see FIG. 15A).

As illustrated in FIG. 16A, a bearing 140 that supports one end 141a of the shaft 138 is formed from an upper surface 137a of a distal end (left end in FIG. 15B) of the arm lower part 137 to the lower part 131. Further, a bearing 139 is formed at a distal end (left end in FIG. 15B) of the lower surface 135b of the arm upper part 135 in order to support the other end 141b of the shaft 138 (see FIG. 18). Both of the bearings 139, 140 have groove shapes which are elongated in an extending direction of the arm upper part 135 and the arm lower part 137 and which include at their inner end a curved surface generally identical to the outer circumference of the shaft 138 to be supported.

The shaft 138, as illustrated in FIGS. 18A, 18B, 18C and 19, includes a shaft body 141 (projection) of a cylindrical shape having a predetermined diameter D1, and a different diameter shaft 142 of a cylindrical shape having a diameter D2 (<D1) smaller than that of the shaft body 141. The most part of the shaft 138 is the shaft body 141, and supports the driven pulley 48 in a rotation free manner. The different diameter shaft 142 is formed into one piece with the shaft body 141 and projects in the axial direction from one end of the shaft body 141. The shaft body 141 and the different diameter shaft 142 are integrally formed from metal such as steel. This different diameter shaft 142 is provided for preventing an undesirable rotation of the shaft body 141. An axis G2 of the different diameter shaft 142 (a dashed line G2 in FIG. 18A) is in parallel with an axis G1 of the shaft body 141 (a dashed line G1 in FIG. 18A). The axis G2 is not aligned with the axis G1 but is spaced (biased) from the axis G1 by a predetermined distance Δd.

For example, when the diameter D1 of the shaft body 141 is set to be 2.48 mm, and the diameter D2 of the different diameter shaft 142 is set to be 1.5 mm, the distance Δd is set to be 0.3 mm. The shaft 138 may be formed from a steel wire by cold forging. In this case, the circumference of the different diameter shaft 142 is formed within the circumference of the shaft body 141.

The bearing 140 supports the shaft 138 at the side of the different diameter shaft 142. More specifically, the bearing 140 supports one end 141a of the shaft body 141 at the side of the different diameter shaft 142. The different diameter shaft 142 is fit into a fitting groove 143 (FIG. 16A) formed, as a fitting part for the different diameter shaft 142, at a position lower from the bearing 140. Accordingly, the different diameter shaft 142 is held by the fitting groove 143. The bearing 140 is formed to have a groove width that corresponds to the diameter of the shaft body 141. That is, the groove width of the bearing 140 (the horizontal direction in FIG. 16A) has such a dimension that a predetermined tolerance is added to the diameter of the shaft body 141. The bearing 139 supports the other end 141b of the shaft body 141. Therefore, the bearing 139 has a groove width identical to that of the bearing 140. The groove width of the fitting groove 143 is generally the same dimension as the diameter of the different diameter shaft 142.

More specifically, as shown in FIGS. 20A and 20B, the shaft body 141 around which the pulley 48 is attached is fitted into the bearings 139, 140 from one end of the holder body 124 (from a left end in FIG. 20A), while the different diameter shaft 142 is fitted into the fitting groove 143. The bearings 139, 140 and the fitting groove 143 are formed to be open at the one end (left end in FIG. 20A) of the holder body 124 so as to allow the shaft 138 to be slidably inserted thereinto. The fitting groove 143 has a narrow portion 143a (FIG. 17) that is formed at an open end of the fitting groove 143 and has a smaller groove width than the groove width of the rest of the fitting groove 143. The narrow portion 143a functions as a stopper that prevents the different diameter shaft 142 from being removed from the fitting groove 143 to thereby prevent the shaft 138 from being removed from the holder body 124. For example, when the diameter D2 of the different diameter shaft 142 is set to be 1.5 mm, the groove width of the fitting groove 143 is set to be 1.42 mm, and the groove width of the narrow portion 143a is set to be 1.3 mm.

As stated above, the axis G2 of the different diameter shaft 142 is spaced (biased) from the axis G1 of the shaft body 141 by a predetermined distance Δd. Therefore, when the bearing 140 receives the shaft body 141 of the shaft 138 as well as the fitting groove 143 receives the different diameter shaft 142, the axis G1 of the shaft body 141 and the axis G2 of the different diameter shaft 142 are positioned spaced from each other in a longitudinal direction of the bearing 140 and the fitting groove 143, namely, in the horizontal direction in FIG. 15A. Accordingly, in order to allow the shaft body 141 to rotate with regard to the bearing 140, the different diameter shaft 142 is required to rotate around the axis G1 of the shaft body 141. However, since the different diameter shaft 142 is fit into the fitting groove 143, the rotation of the different diameter shaft 142 around the axis G1 is restricted. Consequently, the shaft body 141 is not allowed to rotate with regard to the bearing 140.

The lower part 131 of the holder body 124 is formed with first fitting parts 161 and second fitting parts 162. The first fitting parts 161 are fit into first edge parts 151, which will be described later, formed on a peripheral edge of the hole 128 (see FIG. 11). Further, the second fitting parts 162 are fit into second edge parts 152, which will be described later, formed on the peripheral edge of the hole 128 (see FIG. 11). FIGS. 15A and 15B illustrate the first fitting part 161 and the second fitting part 162 which appear in the front side; however, these fitting parts 161 and 162 are also formed at the rear side of the apparatus in a symmetrical manner. As such, the first fitting parts 161 and the second fitting parts 162 are paired to be formed on the front side and the rear side.

The first fitting parts 161 include the base 133, first ribs 163 provided at positions spaced from and lower than the lower surface 133a of the base 133 by a predetermined distance, and grooves 165 formed between the base 133 and the first ribs 163. Further, the second fitting parts 162 include the base 133, second ribs 164 provided at positions spaced from and lower than the lower surface 133a by a predetermined distance, and grooves 166 formed between the base 133 and the second ribs 164. In addition, the grooves 165 and 166 are so formed that the groove widths are approximately same as the thickness of the guide rail 44.

As illustrated in FIG. 22, a distance between the bottom surfaces 165a of a pair of grooves 165 formed at the front side and the rear side is set to t1. Since the pair of grooves 165 receive the pair of first edge parts 151, this distance t1 is set to generally the same distance as the distance h1 of the first edge parts 151 (see FIG. 11). Further, a distance between bottom surfaces 166a of a pair of grooves 166 formed at the front side and the rear side is set to t2 that is shorter than the above stated distance t1. Since the pair of grooves 166 receive the pair of second edge parts 152, this distance t2 is set to generally the same distance as the distance h2 of the second edge parts 152 (see FIG. 11). Accordingly, steps are provided between the grooves 165 and the grooves 166 such that the distance between the bottom surfaces 165a, 166a becomes shorter toward the grooves 166.

As illustrated in FIG. 22, a predetermined draft angle φ with regard to a releasing direction from the die (arrow P2 in FIG. 15B) is formed on the bottom surfaces 165a of the grooves 165 and the bottom surfaces 166a of the grooves 166. As stated above, each first fitting part 161 having the groove 165 and each second fitting part 162 having the groove 166 are divided in the releasing direction via a step formed therebetween. In the distance t1 of the paired bottom surfaces 165a and the distance t2 of the paired bottom surfaces 166a, a difference of dimension in the releasing direction according to the draft angle is smaller than a case where the first fitting parts and the second fitting parts are not divided.

As illustrated in FIG. 11, the hole 128 includes the first edge parts 151 to be fit into the first fitting parts 161 and the second edge parts 152 to be fit into the second fitting parts 162. The first edge parts 151 are formed to be opposed to each other in the paper conveying direction (in the up and down direction in FIG. 11). The second edge parts 152 are formed likewise. The first edge parts 151 are formed so as to correspond to the paired grooves 165 of the first fitting parts 161, and the distance h1 thereof is set to a size in which the bottom surfaces 165a of the grooves 165 can be fit thereinto. Further, the second edge parts 152 are formed so as to correspond to the paired grooves 166 of the second fitting parts 162, and the distance h2 thereof is set to a size in which the bottom surfaces 166a of the grooves 166 can be fit thereinto. Therefore, the first edge parts 151 and the second edge parts 152 become narrower as going to the second edge parts 152. At an opposite side of the second edge parts 152 beyond the first edge parts 151, namely, at a right side in FIG. 11, an inserting part 153 which is wider than the distance h1 of the first edge parts 151 is formed. A width h3 of the inserting part 153 is larger than the distance t3 (see FIG. 22) between the bottom surfaces 165a at the ends of the first ribs 163.

The lower part 131 of the pulley holder 125 is inserted from the upper side to the lower side of the guide rail 44 in such a manner that the first ribs 163 are aligned with the inserting part 153 of the hole 128 and the second ribs 164 are aligned between the paired first edge parts 151. Then, the first edge parts 151 are fit into the grooves 165 and the second edge parts 152 are fit into the grooves 166, respectively, to slide the pulley holder 125 in a left direction (in the direction of arrow P0) in FIG. 11. As illustrated in FIG. 15A, the timing belt 49 is wound around the driven pulley 48 supported by the pulley holder 125, and the coil spring 126 is inserted between the spring receiving part 129 and the standup plate 127 to allow the pulley holder 125 to be elastically urged in the belt tension direction (FIG. 15A).

As stated above, each first fitting part 161 and each second fitting part 162 of the pulley holder 125 that are formed along the belt tension direction are divided via the step in the belt tension direction. Since the dimension difference in the releasing direction according to the draft angle is relatively small, plays between the first edge parts 151 and the grooves 165 and between the second edge parts 152 and the grooves 166 become small in the distance t1 between the bottom surfaces 165a of the grooves 165 of the first fitting parts 161 and the distance t2 between the bottom surfaces 166a of the grooves 166 of the second fitting parts 162. Accordingly, the scanning shift of the carriage 38 due to the play of the pulley holder 125 can be reduced, resulting in an enhancement of the image quality to be recorded on the recording paper by the ink jet recording head 39.

Further, a set of the first fitting part 151 and the second fitting part 152 are provided at both sides of the driven pulley 48 in parallel with the belt tension direction, such that the pulley holder 125 can be supported with a good balance with regard to the tension force of the timing belt 49. Accordingly, a supporting strength with regard to the belt tension direction of the driven pulley 48 becomes large and thus becomes stable.

In the pulley holder 125, the holder body 124 supports the shaft 138. The shaft body 141 is supported by the bearings 139, 140 of the holder body 124, and the different diameter shaft 142 is fit into the fitting groove 143. Since the axis G2 of the different diameter shaft 142 is biased from the axis G1 of the shaft body 141, the shaft body 141 would not rotate around the axis G1. As such, even if the rotation of the driving pulley 47 causes the timing belt 49 to have the driven pulley 48 rotate, the shaft body 141 would not rotate with regard to the bearings 139, 140, such that the friction wear of the bearing 139, 140 can be prevented. Therefore, the shift in conveying the carriage 38 and the degrading of the quality of the recorded image by the ink jet recording head 39 can also be prevented.

In addition, the different diameter shaft 142 is formed at one end of the shaft body 141 of the shaft 138 according to the present embodiment; however, the different diameter shaft 142 may be formed at both ends of the shaft body 141. In such a case, the fitting groove 143 is formed also at the side of the bearing 139 and the different diameter shafts 142 at the both ends of the shaft body 141 are to be fitted into the pair of fitting grooves 143, respectively.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A pulley holder for rotatably supporting a pulley around which a belt is to be wound, the pulley holder comprising:
    a shaft including:
        a shaft body that includes a first end portion positioned at a first end thereof, a second end portion positioned at a second end thereof, and a pulley supporting portion positioned between the first end and the second end opposite to the first end in an axial direction of the shaft body, and
        a projection projecting from the second end of the shaft body in the axial direction of the shaft body and biased from an axis of the shaft body; and
    a holder body having a first groove, a second groove, and a third groove,
    wherein the first end portion and the second end portion of the shaft body are received by the first groove and the second groove, respectively, and the projection is received by the third groove to prevent the shaft body from rotating with respect to the holder body while allowing the pulley supported by the pulley supporting portion to rotate around the pulley supporting portion, and
    wherein the shaft body has a cylindrical shape and the projection has a cylindrical shape whose diameter is smaller than the diameter of the shaft body, the axis of the shaft body being parallel with an axis of the projection,
    wherein the belt wounded around the pulley extends from the pulley in a first direction, and the first groove, the second groove, and the third groove extend in a direction parallel to the first direction and are open at an end of the holder body in a second direction opposite to the first direction, and
    wherein a groove width of the first groove is substantially the same as a diameter of the first end portion of the shaft body, a groove width of the second groove is substantially the same as a diameter of the second end portion of the shaft body, and a groove width of the third groove is substantially the same as the diameter of the projection.

2. The pulley holder as claimed in claim 1, wherein the projection is formed into one piece with the shaft body.

3. The pulley holder as claimed in claim 1, wherein the shaft is made of metal, and the holder body is made of synthetic resin.

4. The pulley holder as claimed in claim 3, wherein the projection is formed into one piece with the shaft body.

5. The pulley holder as claimed in claim 1, wherein the holder body is molded using a die.

6. The pulley holder as claimed in claim 5, wherein the holder body is angled with a predetermined draft for an easy releasing from the die.

7. The pulley holder as claimed in claim 1, wherein the third groove of the holder body is formed continuously from the second groove.

8. The pulley holder as claimed in claim 1, wherein the holder body further includes a stopper that narrows the groove width of the third groove and prevents the projection being removed from the third groove.

9. An ink jet type image recording apparatus comprising:
an ink jet recording head for ejecting ink onto a record medium;
a carriage on which the ink jet recording head is mounted;
a belt to which the carriage is attached;
a first pulley around which the belt is wound and which is connected to a driving source;
a second pulley around which the belt is wound and which is arranged at a position spaced from the first pulley by a predetermined distance; and
a pulley holder for rotatably supporting the second pulley, the pulley holder including:
a shaft including:
a shaft body that includes a first end portion positioned at a first end thereof, a second end portion positioned at a second end thereof, and a pulley supporting portion positioned between the first end and the second end opposite to the first end in an axial direction of the shaft body, and
a projection projecting from the second end of the shaft body in the axial direction of the shaft body and biased from an axis of the shaft body; and
a holder body having a first groove, a second groove, and a third groove,
wherein the first end portion and the second end portion of the shaft body are received by the first groove and the second groove, respectively, and the projection is received by the third groove to prevent the shaft body from rotating with respect to the holder body while allowing the pulley supported by the pulley supporting portion to rotate around the pulley supporting portion, and
wherein the shaft body has a cylindrical shape and the projection has a cylindrical shape whose diameter is smaller than the diameter of the shaft body, the axis of the shaft body being parallel with an axis of the projection,
wherein the belt wounded around the pulley extends from the pulley in a first direction, and the first groove, the second groove, and the third groove extend in a direction parallel to the first direction and are open at an end of the holder body in a second direction opposite to the first direction, and
wherein a groove width of the first groove is substantially the same as a diameter of the first end portion of the shaft body, a groove width of the second groove is substantially the same as a diameter of the second end portion of the shaft body, and a groove width of the third groove is substantially the same as the diameter of the projection.

10. The image recording apparatus as claimed in claim 9 further comprising a guide rail on which the carriage is placed.

11. The image recording apparatus as claimed in claim 10, wherein the guide rail is provided with a hole for receiving the pulley holder.

12. The pulley holder as claimed in claim 1, wherein the axis of the projection is biased from the axis of the shaft body by a predetermined distance, and the axis of the projection received by the third groove is spaced away from the axis of the shaft body received by the second groove by the predetermined distance in the first direction.

13. The pulley holder as claimed in claim 1, wherein the third groove is formed at a center of the second groove with respect to a groove width direction which is perpendicular to the first direction.

* * * * *